US008214270B2

(12) United States Patent
Schaefer et al.

(10) Patent No.: US 8,214,270 B2
(45) Date of Patent: Jul. 3, 2012

(54) SYSTEM AND METHOD FOR INTEGRATING BILLING INFORMATION FROM ALTERNATE ENERGY SOURCES WITH TRADITIONAL ENERGY SOURCES

(75) Inventors: Robert J. Schaefer, Boulder, CO (US); Holden R. Caine, Boulder, CO (US)

(73) Assignee: Also Energy, Inc., Boulder, CO (US)

( * ) Notice: Subject to any disclaimer, the term of this patent is extended or adjusted under 35 U.S.C. 154(b) by 652 days.

(21) Appl. No.: 12/349,085

(22) Filed: Jan. 6, 2009

(65) Prior Publication Data

US 2010/0174643 A1 Jul. 8, 2010

(51) Int. Cl.
*G07F 19/00* (2006.01)
*H04M 15/00* (2006.01)
(52) U.S. Cl. ........................................................ 705/34
(58) Field of Classification Search .................... 705/35, 705/34
See application file for complete search history.

(56) References Cited

U.S. PATENT DOCUMENTS

| | | | |
|---|---|---|---|
| 7,215,109 B2* | 5/2007 | Angerame et al. | 324/103 R |
| 2007/0005519 A1* | 1/2007 | Gupta | 705/412 |
| 2009/0055300 A1* | 2/2009 | McDowell | 705/34 |
| 2009/0088991 A1* | 4/2009 | Brzezowski et al. | 702/62 |
| 2009/0132360 A1* | 5/2009 | Arfin et al. | 705/14 |
| 2009/0187445 A1* | 7/2009 | Barclay et al. | 705/7 |
| 2009/0210269 A1* | 8/2009 | Sade | 705/7 |
| 2009/0234750 A1* | 9/2009 | Arfin | 705/26 |
| 2010/0023337 A1* | 1/2010 | Case | 705/1 |

* cited by examiner

*Primary Examiner* — Eric T Wong
(74) *Attorney, Agent, or Firm* — Sheridan Ross P.C.

(57) ABSTRACT

The method and system of the present invention provides for data gathering of energy systems, calculation of billing information for the energy systems to include both traditional energy sources and renewable energy sources, and creation of various outputs to include various user interfaces applicable to overall management of the energy systems. The user interfaces can include integrated, real-time billings to a consumer that measure the cost of the primary energy as well as savings provided by renewable energy sources. The present invention also provides predictive analysis for various aspects of energy use in order to better manage particular facilities that may incorporate renewable energy sources. The gathered data and the various user interfaces enables a user to modify or adjust the use of the renewable energy sources at selected sites to maximize their impact on reducing the cost of the primary energy bill.

13 Claims, 19 Drawing Sheets

| Hour | KBTU load | Total | | | | Electric | | | | Renewable | | | |
|---|---|---|---|---|---|---|---|---|---|---|---|---|---|
| | | kW-hr use | Total kW-hr | Dmd | Bill ($) | kW-hr use | Total kW-hr | Dmd | Bill ($) | kW-hr use | Total kW-hr | Dmd | Bill ($) |
| 1 AM | 0 | 0 | 0 | 0 | - | 0 | 0 | 0 | - | 0 | 0 | 0 | - |
| 2 AM | 0 | 0 | 0 | 0 | - | 0 | 0 | 0 | - | 0 | 0 | 0 | - |
| 3 AM | 0 | 0 | 0 | 0 | - | 0 | 0 | 0 | - | 0 | 0 | 0 | - |
| 4 AM | 0 | 0 | 0 | 0 | - | 0 | 0 | 0 | - | 0 | 0 | 0 | - |
| 5 AM | 0 | 0 | 0 | 0 | - | 0 | 0 | 0 | - | 0 | 0 | 0 | - |
| 6 AM | 0 | 0 | 0 | 0 | - | 0 | 0 | 0 | - | 0 | 0 | 0 | - |
| 7 AM | 0 | 0 | 0 | 0 | - | 0 | 0 | 0 | - | 0 | 0 | 0 | - |
| 8 AM | -890 | 261 | 261 | 130 | 1,938 | 130 | 130 | 65 | 969 | 130 | 130 | 65 | 969 |
| 9 AM | -923 | 271 | 531 | 135 | 2,021 | 108 | 239 | 65 | 974 | 162 | 293 | 70 | 1,047 |
| 10 AM | -727 | 213 | 745 | 135 | 2,030 | 53 | 292 | 65 | 976 | 160 | 453 | 70 | 1,054 |
| 11 AM | -616 | 180 | 925 | 135 | 2,038 | 9 | 301 | 65 | 976 | 171 | 624 | 70 | 1,062 |
| 12 PM | -546 | 160 | 1085 | 135 | 2,045 | 8 | 309 | 65 | 977 | 152 | 776 | 70 | 1,068 |
| 1 PM | -488 | 143 | 1228 | 135 | 2,051 | 7 | 316 | 65 | 977 | 136 | 912 | 70 | 1,074 |
| 2 PM | -430 | 126 | 1354 | 135 | 2,057 | 32 | 348 | 65 | 978 | 95 | 1006 | 70 | 1,078 |
| 3 PM | -402 | 118 | 1471 | 135 | 2,062 | 47 | 395 | 65 | 981 | 71 | 1077 | 70 | 1,082 |
| 4 PM | -396 | 116 | 1587 | 135 | 2,067 | 58 | 453 | 65 | 983 | 58 | 1135 | 70 | 1,084 |
| 5 PM | -402 | 118 | 1705 | 135 | 2,072 | 71 | 523 | 65 | 986 | 47 | 1182 | 70 | 1,086 |
| 6 PM | -298 | 87 | 1792 | 135 | 2,076 | 61 | 584 | 65 | 989 | 26 | 1208 | 70 | 1,087 |
| 7 PM | 0 | 0 | 1792 | 135 | 2,076 | 0 | 584 | 65 | 989 | 0 | 1208 | 70 | 1,087 |
| 8 PM | 0 | 0 | 1792 | 135 | 2,076 | 0 | 584 | 65 | 989 | 0 | 1208 | 70 | 1,087 |
| 9 PM | 0 | 0 | 1792 | 135 | 2,076 | 0 | 584 | 65 | 989 | 0 | 1208 | 70 | 1,087 |
| 10 PM | 0 | 0 | 1792 | 135 | 2,076 | 0 | 584 | 65 | 989 | 0 | 1208 | 70 | 1,087 |
| 11 PM | 0 | 0 | 1792 | 135 | 2,076 | 0 | 584 | 65 | 989 | 0 | 1208 | 70 | 1,087 |
| 12 AM | 0 | 0 | 1792 | 135 | 2,076 | 0 | 584 | 65 | 989 | 0 | 1208 | 70 | 1,087 |

*Fig. 4*

| Day | Total | | | Electric | | | Renewable | | |
|---|---|---|---|---|---|---|---|---|---|
| | Total Use | Dmd | Bill ($) | Total Use | Dmd | Bill ($) | Total Use | Dmd | Bill ($) |
| 1 | 1,792 | 135 | 2,076 | 584 | 65 | 989 | 1,208 | 70 | 1,087 |
| 2 | 3,584 | 135 | 2,154 | 1,169 | 65 | 1,014 | 2,416 | 70 | 1,140 |
| 3 | 5,376 | 135 | 2,232 | 1,753 | 65 | 1,040 | 3,624 | 70 | 1,192 |
| 4 | 7,169 | 135 | 2,310 | 2,337 | 65 | 1,065 | 4,832 | 70 | 1,245 |
| 5 | 8,961 | 135 | 2,387 | 2,921 | 65 | 1,090 | 6,039 | 70 | 1,297 |
| 6 | 10,753 | 135 | 2,465 | 3,506 | 65 | 1,116 | 7,247 | 70 | 1,350 |
| 7 | 12,545 | 135 | 2,543 | 4,090 | 65 | 1,141 | 8,455 | 70 | 1,402 |
| 8 | 14,337 | 135 | 2,621 | 4,674 | 65 | 1,166 | 9,663 | 70 | 1,455 |
| 9 | 16,129 | 135 | 2,699 | 5,259 | 65 | 1,192 | 10,871 | 70 | 1,507 |
| 10 | 17,922 | 135 | 2,777 | 5,843 | 65 | 1,217 | 12,079 | 70 | 1,560 |
| 11 | 19,714 | 135 | 2,855 | 6,427 | 65 | 1,243 | 13,287 | 70 | 1,612 |
| 12 | 21,506 | 135 | 2,933 | 7,011 | 65 | 1,268 | 14,495 | 70 | 1,665 |
| 13 | 23,298 | 135 | 3,010 | 7,596 | 65 | 1,293 | 15,702 | 70 | 1,717 |
| 14 | 25,090 | 135 | 3,088 | 8,180 | 65 | 1,319 | 16,910 | 70 | 1,770 |
| 15 | 26,882 | 135 | 3,166 | 8,764 | 65 | 1,344 | 18,118 | 70 | 1,822 |
| 16 | 28,675 | 135 | 3,244 | 9,348 | 65 | 1,370 | 19,326 | 70 | 1,874 |
| 17 | 30,467 | 135 | 3,322 | 9,933 | 65 | 1,395 | 20,534 | 70 | 1,927 |
| 18 | 32,259 | 135 | 3,400 | 10,517 | 65 | 1,420 | 21,742 | 70 | 1,979 |
| 19 | 34,051 | 135 | 3,478 | 11,101 | 65 | 1,446 | 22,950 | 70 | 2,032 |
| 20 | 35,843 | 135 | 3,556 | 11,686 | 65 | 1,471 | 24,158 | 70 | 2,084 |
| 21 | 37,635 | 135 | 3,633 | 12,270 | 65 | 1,496 | 25,365 | 70 | 2,137 |
| 22 | 39,428 | 135 | 3,711 | 12,854 | 65 | 1,522 | 26,573 | 70 | 2,189 |
| 23 | 41,220 | 135 | 3,789 | 13,438 | 65 | 1,547 | 27,781 | 70 | 2,242 |
| 24 | 43,012 | 135 | 3,867 | 14,023 | 65 | 1,573 | 28,989 | 70 | 2,294 |
| 25 | 44,804 | 135 | 3,945 | 14,607 | 65 | 1,598 | 30,197 | 70 | 2,347 |
| 26 | 46,596 | 135 | 4,023 | 15,191 | 65 | 1,623 | 31,405 | 70 | 2,399 |
| 27 | 48,388 | 135 | 4,101 | 15,776 | 65 | 1,649 | 32,613 | 70 | 2,452 |
| 28 | 50,180 | 135 | 4,178 | 16,360 | 65 | 1,674 | 33,821 | 70 | 2,504 |
| 29 | 51,973 | 135 | 4,256 | 16,944 | 65 | 1,700 | 35,029 | 70 | 2,557 |
| 30 | 53,765 | 135 | 4,334 | 17,528 | 65 | 1,725 | 36,236 | 70 | 2,609 |
| 31 | 55,557 | 135 | 4,412 | 18,113 | 65 | 1,750 | 37,444 | 70 | 2,662 |

*Fig. 5*

| Hour | KBTU load | Total | | | | | | Electric | | | | | Renewable | | | | |
|---|---|---|---|---|---|---|---|---|---|---|---|---|---|---|---|---|---|
| | | kW-hr use | Total kW-hr | Dmd | Pd | Use $ | Total $ | kW-hr use | Total kW-hr | Dmd | Use $ | Total $ | kW-hr use | Total kW-hr | Dmd | Use $ | Total $ |
| 1 AM | 0 | 0 | 0 | 0 | OffPk | 0 | - | 0 | 0 | 0 | 0 | - | 0 | 0 | 0 | 0 | - |
| 2 AM | 0 | 0 | 0 | 0 | OffPk | 0 | - | 0 | 0 | 0 | 0 | - | 0 | 0 | 0 | 0 | - |
| 3 AM | 0 | 0 | 0 | 0 | OffPk | 0 | - | 0 | 0 | 0 | 0 | - | 0 | 0 | 0 | 0 | - |
| 4 AM | 0 | 0 | 0 | 0 | OffPk | 0 | - | 0 | 0 | 0 | 0 | - | 0 | 0 | 0 | 0 | - |
| 5 AM | 0 | 0 | 0 | 0 | OffPk | 0 | - | 0 | 0 | 0 | 0 | - | 0 | 0 | 0 | 0 | - |
| 6 AM | 0 | 0 | 0 | 0 | Semi | 0 | - | 0 | 0 | 0 | 0 | - | 0 | 0 | 0 | 0 | - |
| 7 AM | 524 | 17 | 17 | 17 | Semi | 2 | 2 | 13 | 13 | 13 | 1 | 1 | 4 | 4 | 4 | 0 | 0 |
| 8 AM | 1636 | 53 | 70 | 53 | Semi | 5 | 7 | 27 | 39 | 27 | 3 | 4 | 27 | 31 | 27 | 3 | 3 |
| 9 AM | 1576 | 51 | 122 | 53 | Semi | 5 | 12 | 21 | 60 | 27 | 2 | 6 | 31 | 62 | 27 | 3 | 6 |
| 10 AM | 1629 | 53 | 175 | 53 | Semi | 5 | 17 | 13 | 73 | 27 | 1 | 7 | 40 | 101 | 27 | 4 | 10 |
| 11 AM | 1661 | 54 | 229 | 54 | OnPk | 7 | 24 | 3 | 76 | 27 | 0 | 8 | 51 | 153 | 27 | 6 | 16 |
| 12 PM | 1620 | 53 | 281 | 54 | OnPk | 7 | 31 | 3 | 79 | 27 | 0 | 8 | 50 | 203 | 27 | 6 | 23 |
| 1 PM | 1676 | 55 | 336 | 55 | OnPk | 7 | 37 | 3 | 81 | 27 | 0 | 8 | 52 | 255 | 28 | 6 | 29 |
| 2 PM | 1633 | 53 | 389 | 55 | OnPk | 7 | 44 | 13 | 95 | 27 | 2 | 10 | 40 | 295 | 28 | 5 | 34 |
| 3 PM | 1649 | 54 | 443 | 55 | OnPk | 7 | 50 | 21 | 116 | 27 | 3 | 13 | 32 | 327 | 28 | 4 | 38 |
| 4 PM | 1614 | 53 | 495 | 55 | OnPk | 6 | 57 | 26 | 142 | 27 | 3 | 16 | 26 | 353 | 28 | 3 | 41 |
| 5 PM | 725 | 24 | 519 | 55 | OnPk | 3 | 60 | 14 | 156 | 27 | 2 | 18 | 9 | 363 | 28 | 1 | 42 |
| 6 PM | 576 | 19 | 538 | 55 | Semi | 2 | 62 | 13 | 170 | 27 | 1 | 19 | 6 | 368 | 28 | 1 | 43 |
| 7 PM | 432 | 14 | 552 | 55 | Semi | 1 | 63 | 14 | 184 | 27 | 1 | 20 | 0 | 368 | 28 | 0 | 43 |
| 8 PM | 288 | 9 | 561 | 55 | Semi | 1 | 64 | 9 | 193 | 27 | 1 | 21 | 0 | 368 | 28 | 0 | 43 |
| 9 PM | 0 | 0 | 561 | 55 | Semi | 0 | 64 | 0 | 193 | 27 | 0 | 21 | 0 | 368 | 28 | 0 | 43 |
| 10 PM | 0 | 0 | 561 | 55 | OffPk | 0 | 64 | 0 | 193 | 27 | 0 | 21 | 0 | 368 | 28 | 0 | 43 |
| 11 PM | 0 | 0 | 561 | 55 | OffPk | 0 | 64 | 0 | 193 | 27 | 0 | 21 | 0 | 368 | 28 | 0 | 43 |
| 12 AM | 0 | 0 | 561 | 55 | OffPk | 0 | 64 | 0 | 193 | 27 | 0 | 21 | 0 | 368 | 28 | 0 | 43 |

Fig. 6

| Day | Total | | | | Electric | | | | Renewable | | | |
|---|---|---|---|---|---|---|---|---|---|---|---|---|
| | Total Use | Dmd | Daily Use $ | Use Total $ | Total Use | Dmd | Daily Use $ | Use Total $ | Total Use | Dmd | Daily Use $ | Use Total $ |
| 1 | 561 | 55 | 64 | 64 | 193 | 27 | 21 | 21 | 368 | 28 | 64 | 43 |
| 2 | 1,122 | 55 | 64 | 128 | 386 | 27 | 21 | 42 | 736 | 28 | 64 | 86 |
| 3 | 1,684 | 55 | 64 | 192 | 579 | 27 | 21 | 64 | 1,105 | 28 | 64 | 129 |
| 4 | 2,245 | 55 | 64 | 256 | 772 | 27 | 21 | 85 | 1,473 | 28 | 64 | 171 |
| 5 | 2,806 | 55 | 64 | 320 | 965 | 27 | 21 | 106 | 1,841 | 28 | 64 | 214 |
| 6 | 3,367 | 55 | 64 | 385 | 1,158 | 27 | 21 | 127 | 2,209 | 28 | 64 | 257 |
| 7 | 3,928 | 55 | 64 | 449 | 1,351 | 27 | 21 | 149 | 2,577 | 28 | 64 | 300 |
| 8 | 4,490 | 55 | 64 | 513 | 1,544 | 27 | 21 | 170 | 2,945 | 28 | 64 | 343 |
| 9 | 5,051 | 55 | 64 | 577 | 1,737 | 27 | 21 | 191 | 3,314 | 28 | 64 | 386 |
| 10 | 5,612 | 55 | 64 | 641 | 1,930 | 27 | 21 | 212 | 3,682 | 28 | 64 | 429 |
| 11 | 6,173 | 55 | 64 | 705 | 2,123 | 27 | 21 | 233 | 4,050 | 28 | 64 | 472 |
| 12 | 6,735 | 55 | 64 | 769 | 2,316 | 27 | 21 | 255 | 4,418 | 28 | 64 | 514 |
| 13 | 7,296 | 55 | 64 | 833 | 2,509 | 27 | 21 | 276 | 4,786 | 28 | 64 | 557 |
| 14 | 7,857 | 55 | 64 | 897 | 2,702 | 27 | 21 | 297 | 5,154 | 28 | 64 | 600 |
| 15 | 8,418 | 55 | 64 | 961 | 2,896 | 27 | 21 | 318 | 5,523 | 28 | 64 | 643 |
| 16 | 8,979 | 55 | 64 | 1,025 | 3,089 | 27 | 21 | 339 | 5,891 | 28 | 64 | 686 |
| 17 | 9,541 | 55 | 64 | 1,090 | 3,282 | 27 | 21 | 361 | 6,259 | 28 | 64 | 729 |
| 18 | 10,102 | 55 | 64 | 1,154 | 3,475 | 27 | 21 | 382 | 6,627 | 28 | 64 | 772 |
| 19 | 10,663 | 55 | 64 | 1,218 | 3,668 | 27 | 21 | 403 | 6,995 | 28 | 64 | 815 |
| 20 | 11,224 | 55 | 64 | 1,282 | 3,861 | 27 | 21 | 424 | 7,364 | 28 | 64 | 857 |
| 21 | 11,785 | 55 | 64 | 1,346 | 4,054 | 27 | 21 | 446 | 7,732 | 28 | 64 | 900 |
| 22 | 12,347 | 55 | 64 | 1,410 | 4,247 | 27 | 21 | 467 | 8,100 | 28 | 64 | 943 |
| 23 | 12,908 | 55 | 64 | 1,474 | 4,440 | 27 | 21 | 488 | 8,468 | 28 | 64 | 986 |
| 24 | 13,469 | 55 | 64 | 1,538 | 4,633 | 27 | 21 | 509 | 8,836 | 28 | 64 | 1,029 |
| 25 | 14,030 | 55 | 64 | 1,602 | 4,826 | 27 | 21 | 530 | 9,204 | 28 | 64 | 1,072 |
| 26 | 14,591 | 55 | 64 | 1,666 | 5,019 | 27 | 21 | 552 | 9,573 | 28 | 64 | 1,115 |
| 27 | 15,153 | 55 | 64 | 1,730 | 5,212 | 27 | 21 | 573 | 9,941 | 28 | 64 | 1,158 |
| 28 | 15,714 | 55 | 64 | 1,795 | 5,405 | 27 | 21 | 594 | 10,309 | 28 | 64 | 1,200 |
| 29 | 16,275 | 55 | 64 | 1,859 | 5,598 | 27 | 21 | 615 | 10,677 | 28 | 64 | 1,243 |
| 30 | 16,836 | 55 | 64 | 1,923 | 5,791 | 27 | 21 | 637 | 11,045 | 28 | 64 | 1,286 |
| 31 | 17,398 | 55 | 64 | 1,987 | 5,984 | 27 | 21 | 658 | 11,413 | 28 | 64 | 1,329 |
| | | | Use | $ 1,987 | | | Use | $ 658 | | | Use | $ 1,329 |
| | | | Demand | $ 1,025 | | | Demand | $ 500 | | | Demand | $ 525 |
| | | | Total | $ 3,012 | | | Total | $ 1,158 | | | Total | $ 1,854 |

*Fig. 7*

| Rate | | Summer: May1 - Sept 30 | Low | | High | |
|---|---|---|---|---|---|---|
| 0.13 | $/kW-hr | baseline | 0 | - | 316 | kw-hr/mo |
| 0.15 | $/kW-hr | 101% - 130% of baseline | 316 | - | 411 | kw-hr/mo |
| 0.22 | $/kW-hr | 131 - 200% of baseline | 411 | - | 632 | kw-hr/mo |
| 0.24 | $/kW-hr | over 200% of baseline | 632 | - | | kw-hr/mo |

*Fig. 8*

| Day | Total | | | | Electric | | | | Renewable | | | |
|---|---|---|---|---|---|---|---|---|---|---|---|---|
| | kW-hr | Total kW-hr | kW-hr Rate $ | Daily $ | Total $ | kW-hr | Total kW-hr | kW-hr Rate $ | Daily $ | Total $ | kW-hr | Total kW-hr | Daily $ | Total $ |
| 1 | 34 | 34 | 0.13 | 4 | 4 | 12 | 12 | 0.13 | 2 | 2 | 22 | 22 | 3 | 3 |
| 2 | 34 | 67 | 0.13 | 4 | 9 | 12 | 23 | 0.13 | 2 | 3 | 22 | 44 | 3 | 5 |
| 3 | 34 | 101 | 0.13 | 4 | 13 | 12 | 35 | 0.13 | 2 | 5 | 22 | 66 | 3 | 8 |
| 4 | 34 | 135 | 0.13 | 4 | 18 | 12 | 46 | 0.13 | 2 | 7 | 22 | 89 | 3 | 11 |
| 5 | 34 | 169 | 0.13 | 4 | 22 | 12 | 58 | 0.13 | 2 | 8 | 22 | 111 | 3 | 14 |
| 6 | 34 | 202 | 0.13 | 4 | 26 | 12 | 70 | 0.13 | 2 | 10 | 22 | 133 | 3 | 16 |
| 7 | 34 | 236 | 0.13 | 4 | 31 | 12 | 81 | 0.13 | 2 | 12 | 22 | 155 | 3 | 19 |
| 8 | 34 | 270 | 0.13 | 4 | 35 | 12 | 93 | 0.13 | 2 | 13 | 22 | 177 | 3 | 22 |
| 9 | 34 | 304 | 0.13 | 4 | 40 | 12 | 104 | 0.13 | 2 | 15 | 22 | 199 | 3 | 25 |
| 10 | 34 | 337 | 0.15 | 5 | 45 | 12 | 116 | 0.13 | 2 | 17 | 22 | 221 | 3 | 28 |
| 11 | 34 | 371 | 0.15 | 5 | 50 | 12 | 128 | 0.13 | 2 | 18 | 22 | 243 | 3 | 32 |
| 12 | 34 | 405 | 0.15 | 5 | 55 | 12 | 139 | 0.13 | 2 | 20 | 22 | 266 | 3 | 35 |
| 13 | 34 | 438 | 0.22 | 7 | 62 | 12 | 151 | 0.13 | 2 | 21 | 22 | 288 | 3 | 41 |
| 14 | 34 | 472 | 0.22 | 7 | 69 | 12 | 162 | 0.13 | 2 | 23 | 22 | 310 | 6 | 46 |
| 15 | 34 | 506 | 0.22 | 7 | 77 | 12 | 174 | 0.13 | 2 | 25 | 22 | 332 | 6 | 52 |
| 16 | 34 | 540 | 0.22 | 7 | 84 | 12 | 186 | 0.13 | 2 | 26 | 22 | 354 | 6 | 58 |
| 17 | 34 | 573 | 0.22 | 7 | 91 | 12 | 197 | 0.13 | 2 | 28 | 22 | 376 | 6 | 63 |
| 18 | 34 | 607 | 0.22 | 7 | 99 | 12 | 209 | 0.13 | 2 | 30 | 22 | 398 | 6 | 69 |
| 19 | 34 | 641 | 0.24 | 8 | 107 | 12 | 220 | 0.13 | 2 | 31 | 22 | 420 | 6 | 75 |
| 20 | 34 | 675 | 0.24 | 8 | 115 | 12 | 232 | 0.13 | 2 | 33 | 22 | 443 | 6 | 82 |
| 21 | 34 | 708 | 0.24 | 8 | 123 | 12 | 244 | 0.13 | 2 | 35 | 22 | 465 | 6 | 88 |
| 22 | 34 | 742 | 0.24 | 8 | 131 | 12 | 255 | 0.13 | 2 | 36 | 22 | 487 | 6 | 95 |
| 23 | 34 | 776 | 0.24 | 8 | 139 | 12 | 267 | 0.13 | 2 | 38 | 22 | 509 | 6 | 101 |
| 24 | 34 | 809 | 0.24 | 8 | 147 | 12 | 278 | 0.13 | 2 | 40 | 22 | 531 | 6 | 108 |
| 25 | 34 | 843 | 0.24 | 8 | 155 | 12 | 290 | 0.13 | 2 | 41 | 22 | 553 | 6 | 114 |
| 26 | 34 | 877 | 0.24 | 8 | 163 | 12 | 302 | 0.13 | 2 | 43 | 22 | 575 | 6 | 120 |
| 27 | 34 | 911 | 0.24 | 8 | 171 | 12 | 313 | 0.13 | 2 | 45 | 22 | 597 | 6 | 127 |
| 28 | 34 | 944 | 0.24 | 8 | 180 | 12 | 325 | 0.15 | 2 | 46 | 22 | 620 | 6 | 133 |
| 29 | 34 | 978 | 0.24 | 8 | 188 | 12 | 336 | 0.15 | 2 | 48 | 22 | 642 | 6 | 140 |
| 30 | 34 | 1,012 | 0.24 | 8 | 196 | 12 | 348 | 0.15 | 2 | 50 | 22 | 664 | 6 | 146 |
| 31 | 34 | 1,045 | 0.24 | 8 | 204 | 12 | 360 | 0.15 | 2 | 51 | 22 | 686 | 6 | 153 |

*Fig. 9*

SYSTEM AND METHOD FOR INTEGRATING BILLING INFORMATION FROM ALTERNATE ENERGY SOURCES WITH TRADITIONAL ENERGY SOURCES

FIELD OF THE INVENTION

The present invention relates to systems and methods for integrating alternate or renewable energy sources with traditional energy sources, and more particularly, to an energy consumption billing system and method that determines the value of renewable energy sources so that such information can be integrated within billings provided by an energy source provider who provides traditional energy to a consumer.

BACKGROUND OF THE INVENTION

Electric power and gas power are the common types of power provided by a utility company. Commercial, industrial, and residential users of power each receive a report over a specified period of time that delineates the amount of power or fuel consumed, and the amount of power consumed is converted into a billing sent to the user for payment.

As the cost of traditional energy sources continue to rise, an increased emphasis has been placed on renewable energy sources to thereby reduce the need for power from traditional energy providers. While the use of renewable energy sources increases, there are certain obstacles that still prevent renewable energy sources from being fully integrated with traditional energy sources. In short, the current infrastructure for public utilities is not conducive to incorporating such renewable energy sources for purposes of providing a single integrated billing for customers. Presently, renewable energy sources require separate devices/systems to measure the amount of power that is drawn from such sources, and further, a separate interface is then required to take the measured power from the renewable energy sources to integrate retrieved data in the billing system of the utility provider.

Therefore, there is clearly a need for an energy consumption billing system that integrates both the traditional energy sources as well as renewable energy sources. Further, there is a need to incorporate the renewable energy sources in a manner in which not only can a user receive the periodic billing that shows the value of the renewable energy source, but also a need to provide the user real time information as to the value of the renewable energy source as time progresses over the billing period.

Therefore, it is one object of the present invention to provide a comprehensive energy consumption billing system. It is another object to provide a method that generates detailed data as to the cost of the traditional energy sources. It is another object to provide a method that generates detailed data as to the value of the renewable energy source in reducing the cost of the traditional or primary energy sources. It is another object of the present invention to provide real time data as to a measurement of the value of the renewable energy source based upon the current consumption billing structure and rates of the primary energy sources. It is another object of the present invention to provide a user the ability to observe and control in maximizing the contribution of the renewable energy sources in reducing the cost of the primary energy sources.

These objects as well as others will become more apparent from a review of the following description of the invention.

SUMMARY OF THE INVENTION

In accordance with the present invention, an energy consumption billing system and method are provided that monitors and calculates the real time value of renewable energy sources and the values are then integrated with the billing system of the energy provider in so a single billing can be provided to a customer in which both the renewable energy sources and traditional or primary energy sources are taken into account.

Power delivered by utilities typically takes two forms: electric power and gas power. Renewable energy sources can be used to reduce the need for power from traditional primary energy sources. Primary energy consumption can also be reduced by increasing efficiency or reducing losses. The value of reducing primary energy usage is the difference between what a consumer would have to pay and what they actually pay on their primary energy bill.

Energy bills are typically calculated by multiplying consumption by the applicable billing rate summed over the stated billing period, typically a one month period. Billing rates are pre-established, and consumption is verified and recorded in a real time manner in order to calculate the value of the bill for the billing period.

Usage and demand are the billable consumption components of an energy bill. For example, electric energy usage is typically measured in kilowatt hours. Natural gas is typically measured in therms. Electric demand is often established by a maximum fifteen minute integrated kilowatt demand used during the billing period. The electric demand is typically based upon the peak load infrastructure requirements, and not the actual amount of fuel burned by the utility providing the power source. For example, high demand periods (for example, increased usage in air conditioners over short periods of time during hot summer months) causes the utility provider to cover the increased demand, even though the average demand is significantly lower over most of the rest of the time periods during a billing period. The utility provider must use additional equipment and other resources to handle the peak loads, and this equipment/resources must be ready for use on short notice.

Gas and electricity are typically billed in similar fashions with both variable and fixed components. Variable components include usage, billing rates, and taxes. Fixed components may include service and facility charges billed by the utility provider. As mentioned, electric demand and energy charges are variable over time caused by differing demands attributed to changes in seasons in which a utility provider may establish more expensive rates or peak rates during times in which there is greater demand. For example, the utility provider may establish that summer and on-peak rates are more expensive than winter rates and off-peak rates. Accordingly, demand and energy rates may change based on consumption during a billing period. Therefore, a municipality may establish a number of different gas and electrical rates over a selected season or billing period that changes based upon baseline consumption. Some utilities experiment with incorporating both time of use and consumption based billing rates to reduce peak electric energy usage.

A utility provider calculates monthly bills using measurements from calibrated meters that measure energy. In order to compute a monthly energy bill, a utility may use peak demand, energy usage per day time, accumulated energy consumed in the period, and the rate schedule and taxes. In the present invention, adding the renewable energy source reduces the primary energy required to perform the functions at the user's location, such as heating, cooling, lighting, etc.

In the present invention, calculations are performed to determine the value of reduced energy consumption in which the renewable energy sources are evaluated in terms of their contribution in reducing the cost and amount of energy required from the primary energy sources. The calculations require measurements of the sources of the renewable and primary energy sources, and then calculating the savings provided to the user by integration of the renewable energy sources.

Once the calculations are made, various system outputs in the form of reports and graphical user interfaces can be provided to show a user the savings provided by the renewable energy sources. More specifically, real-time data can be provided to the user in the form of graphic user interfaces on a data processing system in which the user can select particular data to be displayed. Other outputs of the system may include various reports that tabulate the data, and are tailored to provide information on savings provided over various time periods.

The system of the present invention incorporates a data processing system in which information is gathered on an organization that has incorporated renewable energy sources, and the data processing system generates various user interfaces that allow a user to access information as to real-time data that reports on the value of the renewable energy sources.

In another aspect of the invention, the real-time reporting capability of the present invention also provides a user with a predictive analysis on best methods to incorporate renewable energy source in order to maximize reduction of traditional energy sources.

In accordance with the method of the present invention in a preferred embodiment, the method includes: (i) providing at least one computing device having a microprocessor for executing computer coded instructions, said computer coded instructions including instructions for a plurality of equations that calculate attributes of an energy bill; (ii) obtaining an energy demand rate, usage rate, and tax rate for a predetermined time period for a primary energy source; (iii) obtaining a primary energy demand and usage for the period for the primary energy source; (iv) calculating a value of a primary energy bill based upon demand and usage of the primary energy source; (v) obtaining a renewable energy demand and usage from the renewable energy source; (vi) summing the renewable energy usage plus primary usage to calculate period consumption; (vii) summing the renewable plus primary energy usage, plus a period consumption to calculate the total period consumption; (vii) summing the renewable demand plus primary energy demand to calculate a total demand; (viii) calculating a value of a total energy bill; (ix) calculating a renewable energy bill as a difference between the total energy bill and the primary energy bill; (x) storing the values of the renewable energy bill, total energy bill, and primary energy bill in a database; and (xi) generating an output to a consumer in the form of at least one of a billing report or graphical user interface detailing at least the renewable energy bill.

In accordance with the data processing system of the present invention in a preferred embodiment, the system includes: (i) at least one computer having a microprocessor for computing data input to said computer; (ii) at least one site management application including at least one of a software or firmware installation that provides computer coded instructions to said computer for managing data manipulated by said computer; (iii) at least one database incorporated within said computer for storing data regarding energy rates, consumption, and demand; (iv) data inputs from a primary energy source to the computer detailing energy rates, consumption, and demand; (v) data inputs from an renewable energy source to the computer detailing the energy supplied by the renewable energy source; (vi) outputs generated by said data processing system to a user, said outputs including at least one of a billing to a consumer that delineates a renewable energy bill as a difference between a total energy bill and a primary energy bill, and at least one user interface displaying information regarding the renewable energy bill.

Other features and advantages of the present invention will become apparent from a review of the following detailed description, taken in conjunction with the drawings.

BRIEF DESCRIPTION OF THE DRAWINGS

FIG. 4 illustrates one output in accordance with the present invention in the form of a report that details an hour-by-hour operation of a heating system in which the contribution of a renewable energy source to heat a building is shown;

FIG. 5 illustrates another output in accordance with the present invention in the form of another report that details a day-by-day operation of a heating system in which the contribution of a renewable energy source to heat a building is shown;

FIG. 6 illustrates another output in the form of a report that for a system similar to what is shown in FIG. 2, and the report details hour-by-hour operation of the cooling system;

FIG. 7 is another output in the form of a report that can be provided to a user in which the system similar to FIG. 2 is installed to augment cooling at a particular facility, wherein the report details the day-by-day operation of the cooling system;

FIG. 8 is a sample rate schedule of use rates based upon a total month-to-date consumption at four break points or levels relative to a baseline allowance;

FIG. 9 is another output in accordance with the present invention in which a solar thermal cooling system similar to FIG. 2 is installed to augment a traditional cooling system at a facility, and the output is in the form of a report that lists the cost of the traditional energy source and the value of the renewable energy source in which the calculations incorporate the rate schedule for FIG. 8;

DETAILED DESCRIPTION

Figure 1:
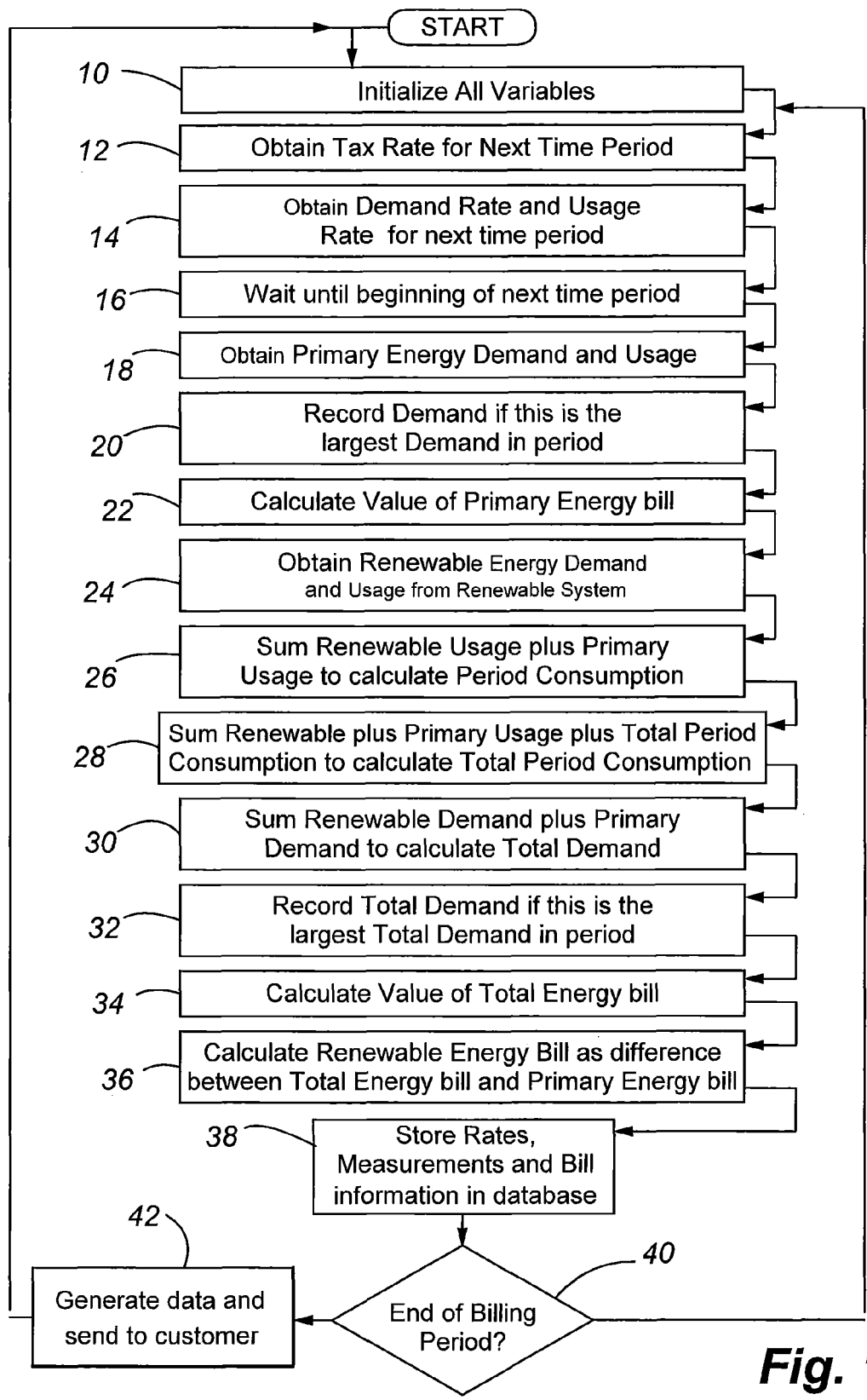
FIG. 1 is a simplified flow diagram illustrating a method of calculating the value or contribution of a renewable energy source as a difference between the total integrated energy bill and the primary energy bill.

The following detailed description describes one or more preferred embodiments of the present invention. First, the detailed description provides sample calculations for a method in which an energy bill can be produced that incorporates renewable energy sources. The detailed description then provides various examples of energy systems that include a renewable energy source, further calculations on how the particular renewable energy sources are incorporated within the overall billing system, as well as example reports or outputs that can be generated from the calculations. The detailed description further provides various user interfaces or outputs that provide information for a user at all levels of an organization that may incorporate the system and method of the present invention.

Utilities may calculate monthly bills using measurements from calibrated meters that measure energy and demand. In order to compute a monthly energy bill, a utility may use peak demand, energy usage per day/time, cumulative energy consumed in the period, the rate schedule, and taxes. Therefore, a primary energy bill based on these factors is expressed as follows:

$$V_{Base}(\text{period}) = \left( E_{BaseDemand} R_{Demand} + \sum_{period} E_{BaseUse}(t) R_{Use}(t, c_{Base}) \Delta t \right)(1 + \text{Taxes})$$

Where
$V_{Base}(\text{period})$ is the baseline Primary Energy billed value for period, $
- $E_{Base,Demand}$ is the measured baseline Demand, kW
- $R_{Demand}$ is the Demand rate, $/kW
- $E_{Base,Use}(t)$ is the measured baseline total energy consumed at day time t, kW
- $R_{Use}(t, c_{Base})$ is the Rate for day time t, cumulative energy used this period c, $/kW-hr
- Taxes are the taxes on the value, %

The above calculation applies to an example electric bill. A similar calculation can also be formed for a gas bill.

Adding renewable energy reduces the primary energy required to perform heating or cooling. This can be expressed as follows:

$$\hat{E}_{Demand} = E_{New,Demand} + E_{Renew,Demand}$$

$$\hat{E}_{Use}(t) = E_{New,Use}(t) + E_{Renew,Use}(t)$$

$$\hat{c} = c_{New} + c_{Renew}$$

Where
$\hat{E}_{Demand}$ is the estimated equivalent Demand, kW
$E_{New,Demand}$ is the newly reduced measured Demand, kW
$E_{Renew,Demand}$ is the energy Demand supplied by the renewable energy system, kW
$\hat{E}_{Use}(t)$ is the estimated equivalent total energy Usage at day time t, kW
$E_{New,Use}(t)$ is the newly reduced measured total energy Usage at day time t, kW
$E_{Renew,Use}(t)$ is the total energy supplied by the renewable energy system at day time t, kW
$\hat{c}$ estimated cumulative energy Usage
$c_{New}$ is the newly reduced measured cumulative energy Usage
$c_{Renew}$ is the cumulative energy supplied by the renewable energy system The foregoing estimation requires real-time knowledge of primary and renewable energy demand and usage and billing rates that has been both impractical and uneconomical. In the past, real-time measurement of primary energy demand and usage required measurement equipment installed along side but separate from the meters owned by a utility company. These separate systems were expensive to install, expensive to maintain, and expensive to insure calibration between the utility company and a customer's meter. Similarly, although energy from renewable energy sources can be measured, current systems are incapable of integrating renewable energy sources with time, usage and demand varying rate structures in real-time. A real-time, accurate and verifiable billing system for renewable or other energy sources may be constructed with the system and method of the present invention.

A real-time calculation of value of reduced energy consumption in the present invention is provided as follows:

$$\hat{V}_{P+R}(\text{period}) = \left( \hat{E}_{Demand} R_{Demand} + \sum_{period} \hat{E}_{Use}(t) R_{Use}(t, \hat{c}) \Delta t \right)(1 + \text{Taxes})$$

Where
$\hat{V}_{P+R}(\text{period})$ is the Primary plus Renewable energy billable value for period, $
$R_{Use}(t,\hat{c})$ is the Rate for day time t, estimated cumulative energy $\hat{c}$, $/kW-hr The Primary Energy bill, newly reduced by Renewable Energy or other strategies, is:

$$V_{New}(\text{period}) = \left( E_{New,Demand} R_{Demand} + \sum_{period} E_{New,Use}(t) R_{Use}(t, c_{New}) \Delta t \right)(1 + \text{Taxes})$$

Where
$V_{New}(\text{period})$ is the new, reduced billable Primary Energy value during period, $
$R_{Use}(t,c_{New})$ is the Rate for day time t, cumulative energy used this period c, $/kW-hr The real time value of the supplied renewable energy is the difference between the estimated and billed values:
$V_{Renew}(\text{period}) = \hat{V}_{P+R}(\text{period}) - V_{New}(\text{period})$
Where
$V_{Renew}(\text{period})$ is the billable value of the Renewable Energy during period, $ The above calculation applies to the electric energy used in a billing period. A separate calculation is conducted for gas energy used in a billing period.

The Primary plus Renewable Energy bill is designated as: $\hat{V}_{P+R}$(period) The new Primary Energy bill is designated as: $V_{New}$(period). The real time value of the renewable energy is designated as: $V_{Renew}$(period).

This requires knowledge of the rate structure:
- $R_{Demand}$ is the Demand rate, \$/kW
- $R_{Use}(t, c_{Base})$ is the Rate for day time t, cumulative energy used this period c, \$/kW-hr The newly reduced Primary Energy Usage, period Consumption and Demand
- $E_{New,Use}(t)$ is the newly reduced measured total energy Usage at day time t, kW
- $c_{New}$ is the newly reduced measured cumulative energy
- $E_{New\ Demand}$ is the newly reduced measured Demand, kW The taxes should be considered where:
Taxes are the taxes on the value, %

And the Renewable Energy Usage, period Consumption and Demand
- $E_{Renew,Demand}$ is the energy Demand supplied by the renewable energy system, kW
- $E_{Renew,Use}(t)$ is the total energy supplied by the renewable energy system at day time t, kW
- $c_{Renew}$ is the cumulative energy supplied by the renewable energy system Thus, the present invention separately calculates the primary plus renewable energy bill and the new primary energy bill so that a real-time value of the renewable energy can be determined.

The present invention calculates the value of alternative/renewable energy produced on-site, such as may be provided by solar collectors or wind turbines. These systems may be connected to conventional HVAC equipment to distribute produced energy throughout a building or complex. The amount of energy required to heat, cool and electrically power a building/complex is measured by devices installed at appropriate points throughout the various utility systems with a building. In lossy systems, i.e. thermal systems, the consumed energy is measured as closely to the point at which the energy is used. For example, flow and temperature sensors on a water-based heating system can accurately determine the amount of heat energy being consumed by the building. This information, along with the current energy rates may be used to calculate a reasonable equivalent value for that energy if it were to be provided from traditional sources. Since all systems incur losses and operate at various levels of efficiency, the calculation must consider these losses in order to estimate the equivalent amount of fuel or energy that would be required from a traditional source, such as natural gas, if the energy were not produced on-site. These losses may be calculated from measurements of an existing system before it is replaced by an on-site system, or it may be estimated using assumptions of typical performance that can be expected from conventional heating and cooling equipment. Government and Utility incentives may be available for generating energy from alternate energy sources. The present invention also includes calculations for reports to utilities and government agencies for purposes of receiving cash payments, tax breaks, emissions offset payments or carbon credits. In the present invention, it is preferable for the energy provider to be responsible for design, procurement, installation, operation and maintenance of the system to include both the traditional energy sources and the alternative/renewable energy sources. This allows a consumer to more easily adopt an alternate energy source without additional effort beyond what is comparable to acquire energy from traditional sources. Also, it is preferable for the energy provider to be free to negotiate an appropriate service level agreement with the consumer to bill for the energy consumed on-site, at the prevailing rate, or a fraction thereof. The system and method of the present invention is flexible enough to allow the energy provider to be creative in tailoring a billing system for the needs of different consumers.

Referring to FIG. 1, a simplified flow chart is provided of the method of calculation. The method or process as set forth in FIG. 1 is repeated and summed for all heating and cooling loads per customer or entity being serviced. At step 10, all variables are initialized. The variables, for example include: primary energy demand, renewable energy demand, total primary energy bill, total renewable energy bill, consumption in period—variables that are persistent across days and the billing period. At step 12, tax rates are obtained for the next time period. At step 14, the demand rates and usage rates are obtained for the next time period. At step 16, there is some period of waiting until the next time period commences in which the calculations can be conducted based upon the rates obtained for the next time period. At step 18, primary energy demand and usage are obtained for the particular customer/entity being serviced. At step 20, the demand is recorded if it is the largest demand within the billing period. At step 22, the value of the primary energy bill can be calculated. At step 24, the renewable energy demand and usage from the installed renewable system is obtained. At step 26, the renewable usage plus primary usage is summed to calculate the period consumption. At step 28, the renewable plus energy usage plus total period of consumption is summed to calculate total period of consumption. At step 30, the renewable demand plus the primary demand is summed to calculate the total demand. At step 32, the total demand is recorded if it is the largest total demand in the period. At step 34, the value of the total energy bill is calculated. At step 36, the value of the renewable energy source is obtained as a difference between the total energy bill and the primary energy bill. At step 38, the rates, measurements, and billing information is stored in a database for later retrieval by a user. At step 40, if the end of the billing period has been reached, then at step 42, the system can generate the data in the form of reports or other user outputs for the consumer. The process is then repeated based upon each designated billing period.

Although FIG. 1 shows a single path, sequential process, it shall be understood that a number of the steps in the method can be conducted simultaneously in order to timely generate a renewable energy bill/report as the difference between the total energy bill and the primary energy bill. For example, obtaining tax, demand, and usage rates can be done in any order or simultaneously.

In order to obtain the renewable energy demand and usage from a renewable system, this requires a calculation in a two-step process where the renewable energy used is quantified (for example in BTUs), and then the BTU's are converted to the unit of measure for the primary energy source (kilowatt hours or therms) and the BTU's are converted to a demand figure.

Figure 2:
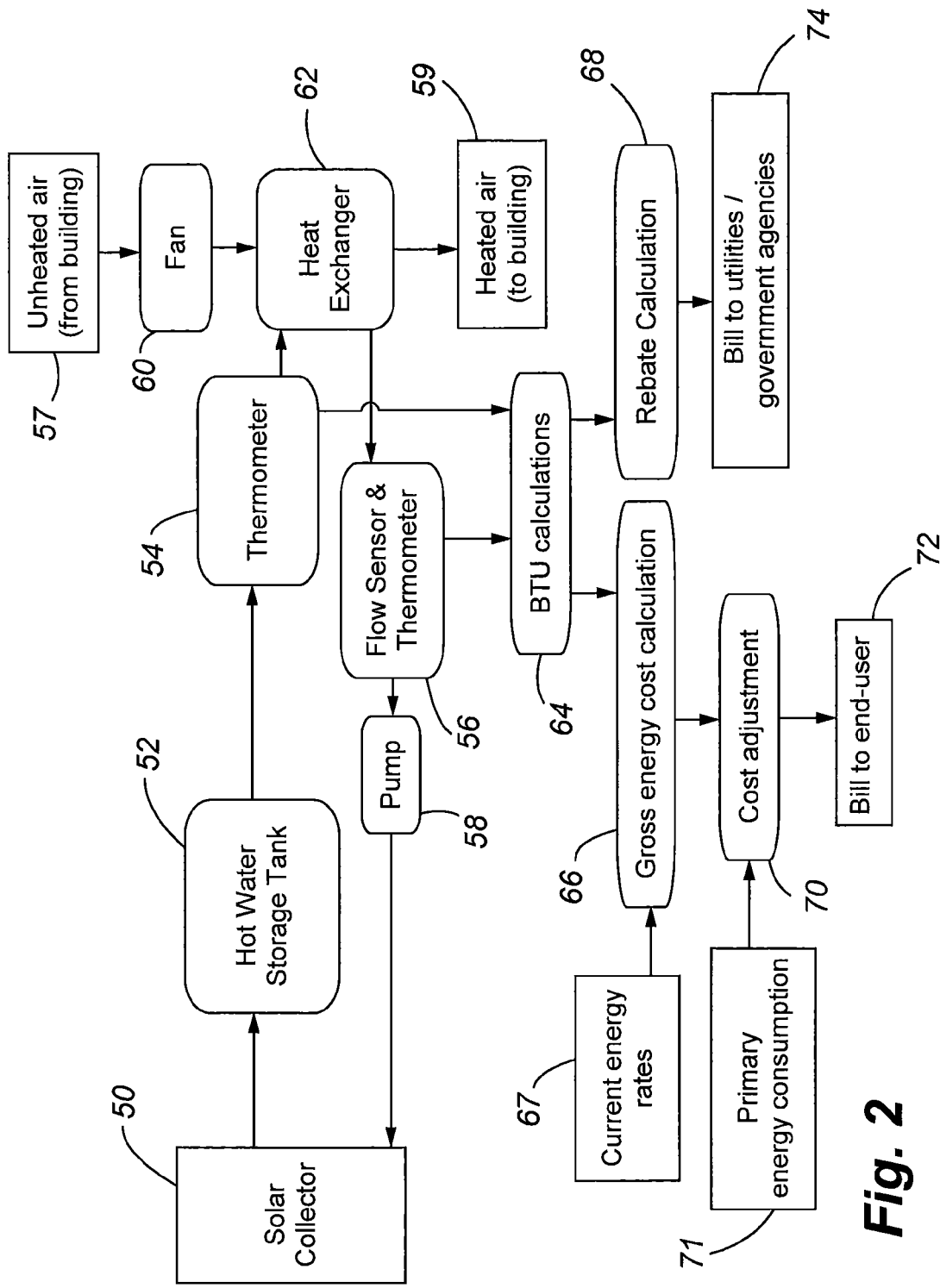
FIG. 2 is a schematic diagram illustrating a solar heating system in which the billing system and method of the present invention can be used to calculate the value of the renewable energy source and to provide various outputs to a user.

Referring to FIG. 2, an example solar heating system is provided, and a subsequent calculation is then obtained for determining the renewable energy demand and usage. In FIG. 2, an example solar heating system is provided to generate the renewable energy. As shown in this Figure, a solar collector 50 is provided, such as an array of solar panels that convert collected sunlight to heat water. A hot water storage tank 52 is heated by the energy captured by the solar collector 50. A thermometer 54 is used to measure the temperature of the hot water as it is heated, and the hot water is provided to a heat exchanger 62 that communicates with a fan 60. The fan 60 creates a flow of unheated air 57 to the heat exchanger 62. The heat exchanger heats the air that is then distributed to the building 59. A flow sensor and thermometer combination 56 record the flow of heated water through the heat exchanger and the temperature of the heated water from the hot storage tank provided to the heat exchanger. A pump 58 then returns the water from the heat exchanger back to the storage tank where the water can be re-heated.

The temperature data obtained from the flow sensor and thermometer combination 56 and the thermometer 54 can be used for a BTU calculation 64. From this BTU calculation 64, a gross energy cost calculation 66 can be generated, as well as a cost adjustment 70 that can be taken into account for the bill sent to the end user 72. The cost adjustment takes into consideration primary energy consumption 71 when calculating the renewable energy value. The BTU calculation 64 can also be used to generate a rebate calculation 68 that is then sent to a utility or government agency as a bill 74 in order to obtain an energy rebate or credit for the user. The current energy rate 67 is also required as shown for calculating the gross energy cost calculation 66.

For quantifying the renewable energy used in BTUs in the example of FIG. 2, the amount of power that is extracted from the hot water stream and used to heat the air passing through the heat exchanger can be calculated as follows:

$$\dot{Q} = (p\,A\,c)v(t)\Delta T(t)$$

Where
$\dot{Q}$ is the power extracted: kJ sec$^{-1}$
p is the density of the heating media: kg m$^{-3}$
A is the pipe cross sectional area where the velocity measurement is taken: m$^2$
c is the specific heat of the heating media: kJ kg$^{-1}$ °C.$^{-1}$
v(t) is the velocity of the heating media at time t at flow sensor (56): m sec$^{-1}$
$\Delta T(t)$ is the temperature change of the heating media at time t across (56) to (54): °C.

The calculation is integrated in time to get BTU consumed:

$$Q(t) = \sum_t (\rho A c) v(t) \Delta T(t) \Delta t$$

Where
Q(t) is the power extracted in time period t: kJ

Multiplying by $\left(\dfrac{0.9478\ \text{BTU}}{\text{kJ}}\right)$ converts kJ to BTU.

The efficiency of electric heaters varies based on the operating point—inside air temperature, outside air temperature, humidity, pressure, etc. Efficiency relates the amount of energy input to output energy. A dimensionless efficiency can be defined as related to the operating point as $\eta_{electric\ heat}$. The total energy input in BTU can be calculated from the BTU output and efficiency:

$$E_{Renew}(t) = \frac{Q(t)}{\eta_{electric\ heat}} = \sum_t \frac{(\rho A c) v(t) \Delta T(t)}{\eta_{electric\ heat}} \Delta t$$

Where
$E_{Renew}(t)$ is the total electric energy required in time period t: BTU $\eta_{electric\ heat}$ is the efficiency of the electric heater at the operating point Multiplying by $\left(\dfrac{0.293\ \text{W hr}}{\text{BTU}}\ \dfrac{\text{kW}}{1000\ \text{W}}\right)$ converts BTU to kW-hr.

The efficiency of gas heaters varies based on the operating point—inside air temperature, outside air temperature, humidity, pressure, etc. Efficiency relates the amount of energy input to output energy. One of two measurements is used: AFUE or Annual Fuel Utilization Efficiency relates average seasonal loads as $$AFUE = \frac{\text{BTU}_{OUT}}{\text{BTU}_{IN}}$$

FUE or Fuel Utilization Efficiency relates an operating point as $$FUE = \frac{\text{BTU}_{OUT}}{\text{BTU}_{IN}}$$

The relationship between AFUE and FUE changes depending on the location because equipment performance is dependent of air temperatures, humidity, and pressures. AFUE fixes the location and calculates an average efficiency based on climate, FUE fixes the operating point.

A dimensionless efficiency can be defined as related to the operating point, $\eta_{gas\ heat}$. The total energy input in BTU can be calculated from the BTU output and efficiency:

$$E_{Renew}(t) = \frac{Q(t)}{\eta_{gas\ heat}} = \sum_t \frac{(\rho A c) v(t) \Delta T(t)}{\eta_{gas\ heat}} \Delta t$$

Where
$E_{Renew}(t)$ is the total gas energy required in time period t: BTU
$\eta_{gas\ heat}$ is the efficiency of the gas heater at the operating point Multiplying by $\left(\dfrac{1\ \text{Therm}}{100{,}000\ \text{BTU}}\right)$ converts BTU to Therms.

Figure 3:
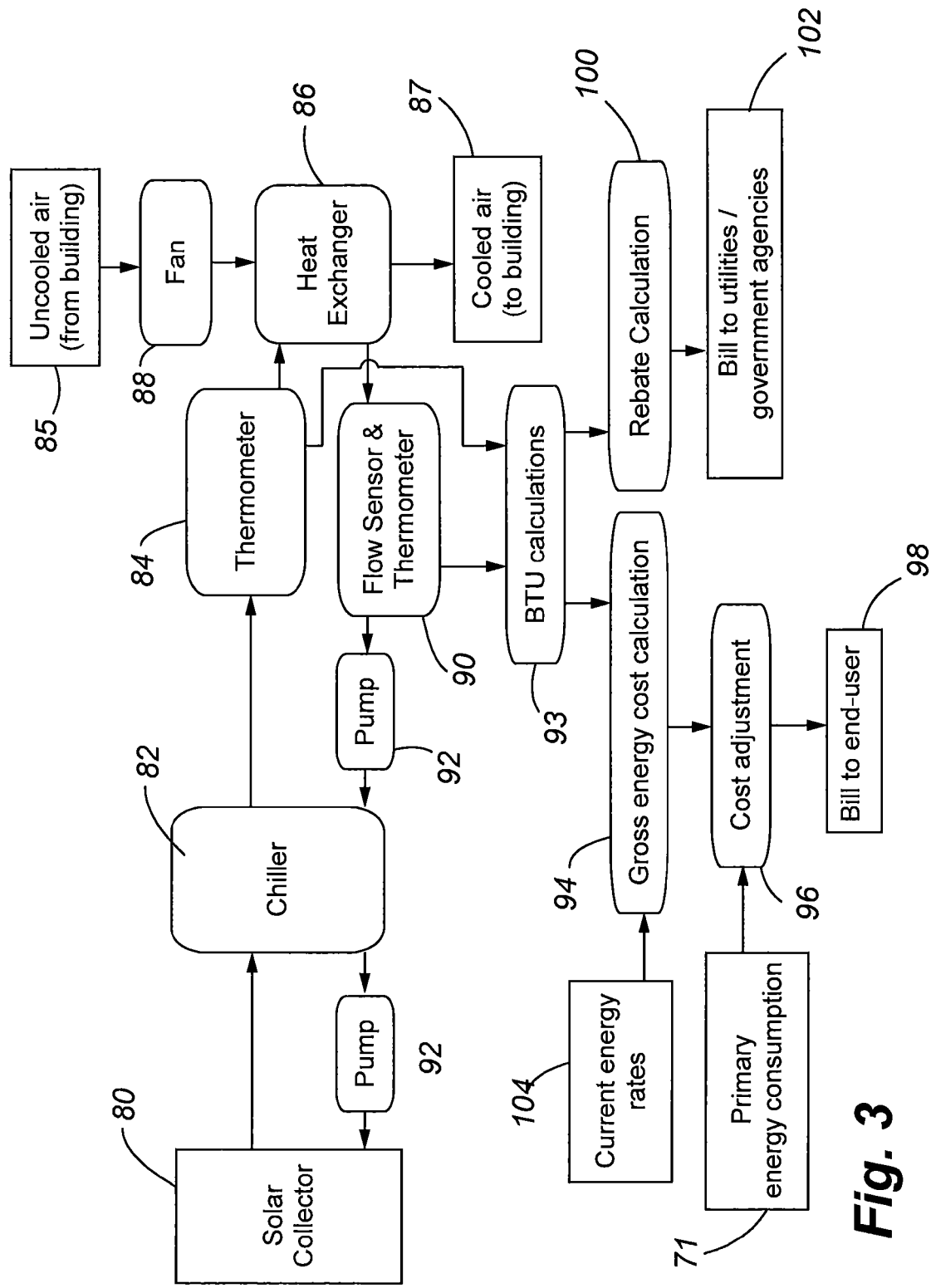
FIG. 3 is another schematic diagram illustrating a solar cooling system in which the billing system and method of the present invention can be used to provide the value of the renewable energy source and various outputs to a user.

Referring to FIG. 3, another example can be provided for calculation of the renewable energy demand and usage for another renewable energy source, namely a solar cooling system. The solar cooling system includes a solar collector 80 such as an array of solar panels that heats water to drive chiller unit 82. The chiller unit outputs cold water that is pumped into a liquid to air heat exchanger 86. Fan 88 generates a flow of air 85 through the heat exchanger 86 that is then distributed to the building 87. A thermometer 84 measures the temperature of the water from the chiller. A flow sensor and thermometer 90 monitor the amount and temperature of the water passing through the heat exchanger 86. The water is returned by pump 92 to the chiller 82. From the flow sensor and thermometer readings 90 and the thermometer reading 84, another BTU calculation 93 can be generated. From the BTU calculation 93, a gross energy cost calculation 94 and a cost adjustment 96 can be made. The bill 98 to the end user therefore accounts for the cost adjustment from the renewable energy source. From the BTU calculation 92, a rebate calculation 100 can also be made resulting in a bill 102 sent to a utility or government agency for a refund or credit. Current energy rates 104 are also taken into consideration in calculating the gross energy cost calculation. The cost adjustment takes into consideration primary energy consumption when calculating the renewable energy value.

For the system of FIG. 3, the amount of power that is extracted from the cold water stream and used to cool the air flowing through the heat exchanger can be calculated as follows:

$$\dot{Q} = (p\, A\, c) v(t) \Delta T(t)$$

Where $\dot{Q}$ is the power extracted: kJ sec$^{-1}$ p is the density of the cooling media: kg m$^{-3}$ A is the pipe cross sectional area where the velocity measurement is taken: m$^2$ c is the specific heat of the heating media: kJ kg$^{-1}$ °C.$^{-1}$ v(t) is the velocity of the cooling media at time t at flow sensor (90): m sec$^{-1}$ $\Delta T(t)$ is the temperature change of the heating media at time t across (84) to (90): °C.

The calculation is integrated in time to get BTU consumed:

$$Q(t) = \sum_t (\rho A c) v(t) \Delta T(t) \Delta t$$

Where

Q(t) is the power extracted in time period t: kJ

Multiplying by $\left( \frac{0.9478\ \text{BTU}}{\text{kJ}} \right)$ converts kJ to BTU.

The efficiency of electric powered air conditioners is defined by the Air Conditioning And Refrigeration Institute in its standard 210/240 Performance Rating of Unitary Air-Conditioning and Air-Source Heat Pump Equipment last updated in 2006. Efficiency relates the amount of energy input to remove heat energy. Depending on the units, one of three measurements is used: SEER or Seasonal Efficiency Energy Ratio relates average seasonal BTU load to W-hr as $$SEER = \frac{\text{BTU}}{\text{W-hr}}$$

EER or Efficiency Energy Ratio relates BTU load to W-hr at one operating point as $$EER = \frac{\text{BTU}}{\text{W-hr}}$$

COP or Coefficient of Performance relates BTU input to remove BTU as $$COP = \frac{\text{BTU}_{OUT}}{\text{BTU}_{IN}}$$

The United States requires that residential systems manufactured after 2005 have a minimum SEER rating of 13, although window units are exempt from this law so their SEERs are still around 10. Residential split-system ACs of SEER 18 or more are now available, but at substantial cost premiums over the standard SEER 13 units. There are no laws regulating SEER in commercial applications.

The relationship between SEER and EER changes depending on the location because equipment performance is dependent of air temperatures, humidity, and pressures. SEER fixes the location and calculates an average efficiency based on climate, EER fixes the operating point. Wikipedia® lists two locations as examples that emphasize the difference between SEER and EER:

In California: EER≈0.9* SEER

In Georgia: EER≈0.8* SEER

Let us define a dimensionless efficiency related to the operating point, $\eta_{electric\ cooling}$. Knowing BTU used, the total energy input in BTU can be calculated:

$$E_{Renew}(t) = \frac{Q(t)}{\eta_{electric\ cooling}} = \sum_t \frac{(\rho A c) v(t) \Delta T(t)}{\eta_{electric\ cooling}} \Delta t$$

Where $E_{Renew}(t)$ is the total electric energy required in time period t: BTU $\eta_{electric\ cooling}$ is the efficiency of the Air Conditioner Unit at the operating point Multiplying by $\left( \frac{0.293\ \text{W hr}}{\text{BTU}} \frac{\text{kW}}{1000\ \text{W}} \right)$ converts BTU to kW-hr.

Note that $\eta_{electric\ cooling}$ can be approximated as SEER.

FIG. 4 illustrates one example of a report that can be generated from the above calculations. This report can also serve as the bill to the consumer where the total cost of the bill is shown, as well as the bill for the electric energy and the "bill" for the renewable energy source. The bill for the renewable energy source can also be figured as an offset or credit to the total bill if the consumer owns the renewable energy components or has otherwise arranged for the energy produced from the renewable energy source to reduce the cost of the primary electric bill. FIG. 4 is a report providing an hour-by-hour recordation of operation for a heating system, such as the one illustrated in FIG. 2. In the example, a solar heating system similar to FIG. 2 is installed to augment an electric heat system in a hypothetical 30,0000 square foot commercial building. The renewable system provides a variable amount of supplementary heat depending upon incoming solar energy. The required heat is shown in the column marked "Total". The figure shows the contribution of electricity and renewable energy to heat the building. The demand is the maximum integrated 15 minute Kw usage during the hour. The maximum demand during the month is what is billed. This figure assumes no other electrical loads are present, only loads for heating in order better illustrate the contribution of the renewable energy This figure highlights the renewable energy source reducing both the usage and demand on an hourly basis and the method to calculate the value of the renewable energy source using only use and demand values. This can be seen when comparing the Total kW-hr use column with the kW-hr use values in the Electric and Renewable columns. This can also be seen when comparing the total demand (Dmd) column with the demand (Dmd) values in the Electric and Renewable columns. The billing method described herein employs both use and demand to calculate the value to the end user of the renewable energy generated. The present invention is therefore an improvement over previous methods that are used only to generate a bill. Previous methods calculated the value of the renewable energy used differently than the utility did, consequently, there was no basis for determining that the renewable energy was either priced more or less than the primary energy it displaced. Thus, the advantages of the present invention are provided when data is recorded from the primary and renewable energy systems at the same time. If this simultaneous recording is not done, then demand reduction cannot be calculated—peak building demand may not occur during peak renewable energy production. Further, as this data is captured real time, real time costs may be displayed, real time values may be shown and decisions and actions may be taken to minimize primary energy costs.

FIG. 5 shows another output in the form of a report or bill that details the cumulative usage and demand for a month in which the data is recorded on a day-by-day basis. The example in FIG. 5 has assumed a similar weather for each every day and no change in usage for weekends or holidays that may have occurred during the month. The example of FIG. 5 shows that the solar system provided about ⅔ of the required energy and therefore reduces the energy bill by approximately 60 percent. This figure also highlights the renewable energy source reducing both the usage and demand on a daily basis and the method to calculate the value of the renewable energy source using only use and demand values. This is again evident when comparing the Total kW-hr use column with the kW-hr use values in the Electric and Renewable columns. This again is evident when comparing the total demand (Dmd) column with the demand (Dmd) values in the Electric and Renewable columns. Also, the daily format is critical to understanding the value of the renewable energy system since demand refers to the maximum fifteen minute integrated kilowatt demand used during the billing period—in this case the month. Thus, it can be determined what day set the demand. The system shown here then enables an unskilled operator to further investigate the organization to determine where/when the demand was maximum so that steps may be taken to reduce future demand charges.

FIG. 6 illustrates another output in the form of a report or bill that details an hour-by-hour analysis of a commercial cooling system, such as the cooling system discussed above with respect to FIG. 3. This example can be data representative for a conventional roof top cooling system for a hypothetical 30,000 square foot commercial building. The renewable system provides a variable amount of supplementary cooling depending again on incoming solar energy available. FIG. 6 specifically illustrates an hour-by-hour operation of the system to include the contribution of the renewable energy source as contrasted against the primary electrical energy resource and the total bill as a sum of the two energy producing elements. This figure again highlights the renewable energy source reducing both the usage and demand on an hourly basis and the method to calculate the value of the renewable energy source using use and demand values in a rate structure that changes based on the time of day. In Table 1 below, an example is provided for a summer time pricing of energy.

TABLE 1

| Billing Rates | Summer: (May 1-September 30) | Rate Description |
|---|---|---|
| Use | 0.12 $/kW-hr | on peak summer |
|  | 0.0998 $/kW-hr | semi peak summer |
|  | 0.0774 $/kW-hr | off peak summer |
| Demand | 8.78 $/kW | Non Coincident |
|  | 10.01 $/kW | Summer |

Figure 14:
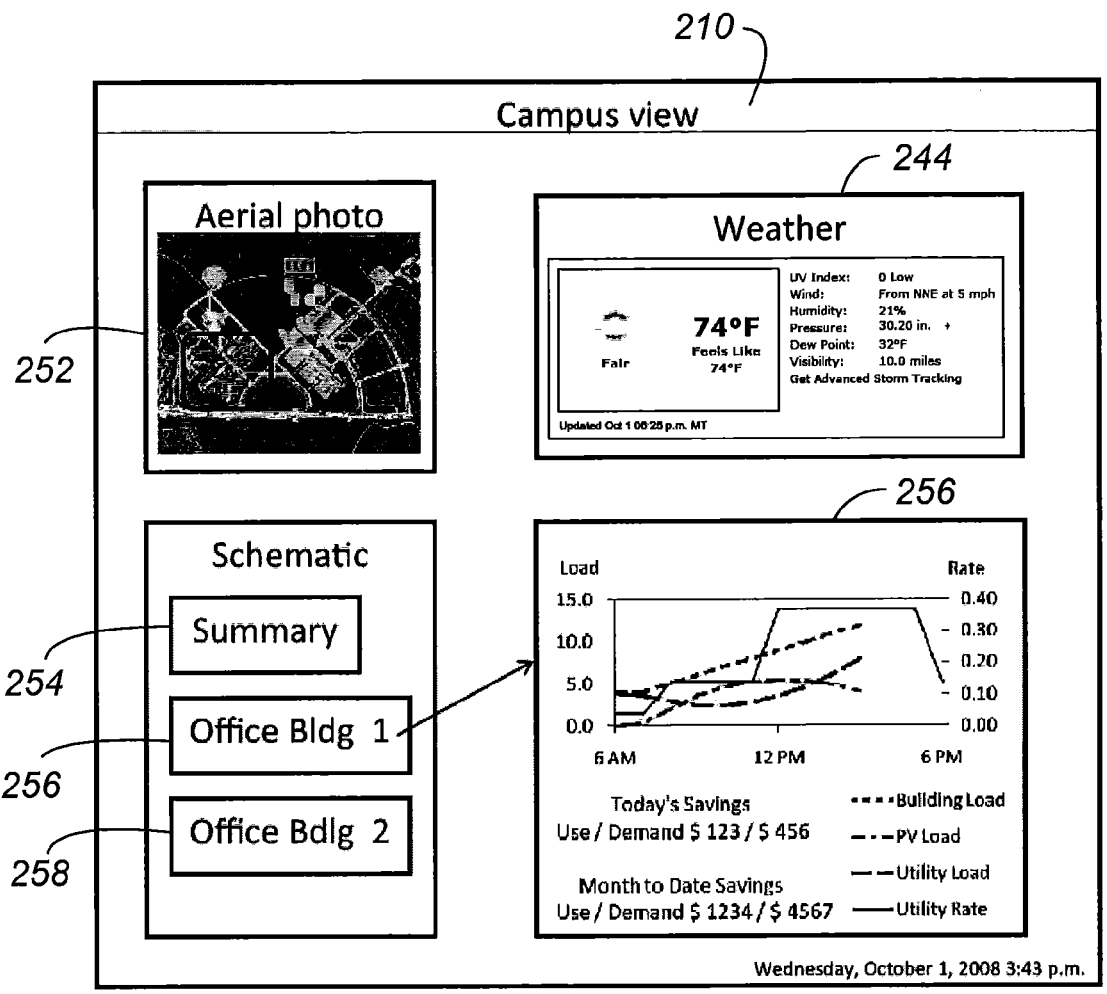
FIG. 14 is another user interface screen showing additional data that can be shown in a campus view.

In this Table 1, it is shown that the value of energy consumed is a function now of not only use and demand, but, also time of day and season. Since the billing method described is real time, rate structures that vary over the course of a day can be incorporated in the present invention. The capability to integrate a variable rate structure is an improvement over previous methods that use only use to generate a bill. Further, as this data is captured real time, real time costs may be displayed, real time values may be shown and decisions and actions may be taken to minimize primary energy costs. The hourly format is critical to understanding the value of the renewable energy system since time of use rates can be easily incorporated into the calculations and displays (as shown in FIG. 14 that shows the rate changing over the course of the day). Again, the system shown enables an unskilled operator to further investigate the organization to determine where/when energy costs were maximum so that steps may be taken to reduce future energy charges.

FIG. 7 illustrates another output in the form of a report or bill that details a day by day operation for a solar thermal cooling system such as the one discussed above with respect to FIG. 3. FIG. 7 shows the cumulative effect through a month period of time, and also again assumes that the weather is the same every day and there has been no change in usage for weekends or holidays. This example shows the solar system again providing about ⅔ of the required energy and a reduction in the utility bill by approximately 62%.

This figure again highlights the renewable energy source reducing both the usage and demand on a daily basis and the method to calculate the value of the renewable energy source using use and demand values in a rate structure that changes based on the time of day. This figure can again incorporate the energy pricing as set forth in the example of Table 1 As with the prior FIGS. 5 and 6, the system shown enables an unskilled operator to further investigate the Organization to determine where/when energy costs were maximum so that steps may be taken to reduce future energy charges on workdays, weekends and holidays.

FIG. 8 provides a sample rate summary for the report/bill created in FIG. 9. The calculations of the present invention can adopt a schedule of rates as shown in FIG. 8 wherein use rates are based on total month to date consumption at designated breakpoints relative to a baseline allowance.

FIG. 9 shows yet another output in the form of a report/bill for a solar photo-voltaic (PV) system in which the system is installed to augment the utility electric supply for a hypothetical 4,000 square foot residential building. Again, the renewable system provides a variable amount of supplementary electricity depending upon incoming solar energy. FIG. 9 more specifically shows the day-by-day operation for a month. Assumptions are again made that the weather is the same every day and there is no change in usage for weekends or holidays. This example report/bill of FIG. 9 shows that the solar system provided about ⅔ of the required energy and reduced the energy bill by approximately 75%. This figure highlights the renewable energy source reducing the usage on a daily basis and the method to calculate the value of the renewable energy source in a rate structure that changes based on total use in the billing period as shown in FIG. 8. FIG. 9 shows that he lowest energy rate occurs from day 1 through 9, the next higher rate from days 10-12, the next higher rate from days 13-18 and the highest rate from days 19-31. The value of energy consumed is twice as expensive on the last day as it is on the first day of the month even though the same amount of energy was consumed. This difference in value of the energy consumed is due to the rate escalating as total consumption during that month increases, causing the rate to go to higher levels. Since the billing method described remembers consumption over the billing period, this rate structure is easily incorporated in the present invention.

Although the FIGS. 4-9 provide reporting in either an hour-by-hour or day-by-day basis, it is also contemplated that a user can select other time periods for reporting to include reports based upon time increments as small as minute-by-minute. The meters/gauges that measure the performance and use of the energy devices (both the traditional and alternative/renewable energy sources) can be incorporated within control loops to provide data on any desired time increment basis so that the calculations of the present invention can be made to generate the reporting that corresponds to the measure of time increments.

Figure 10:
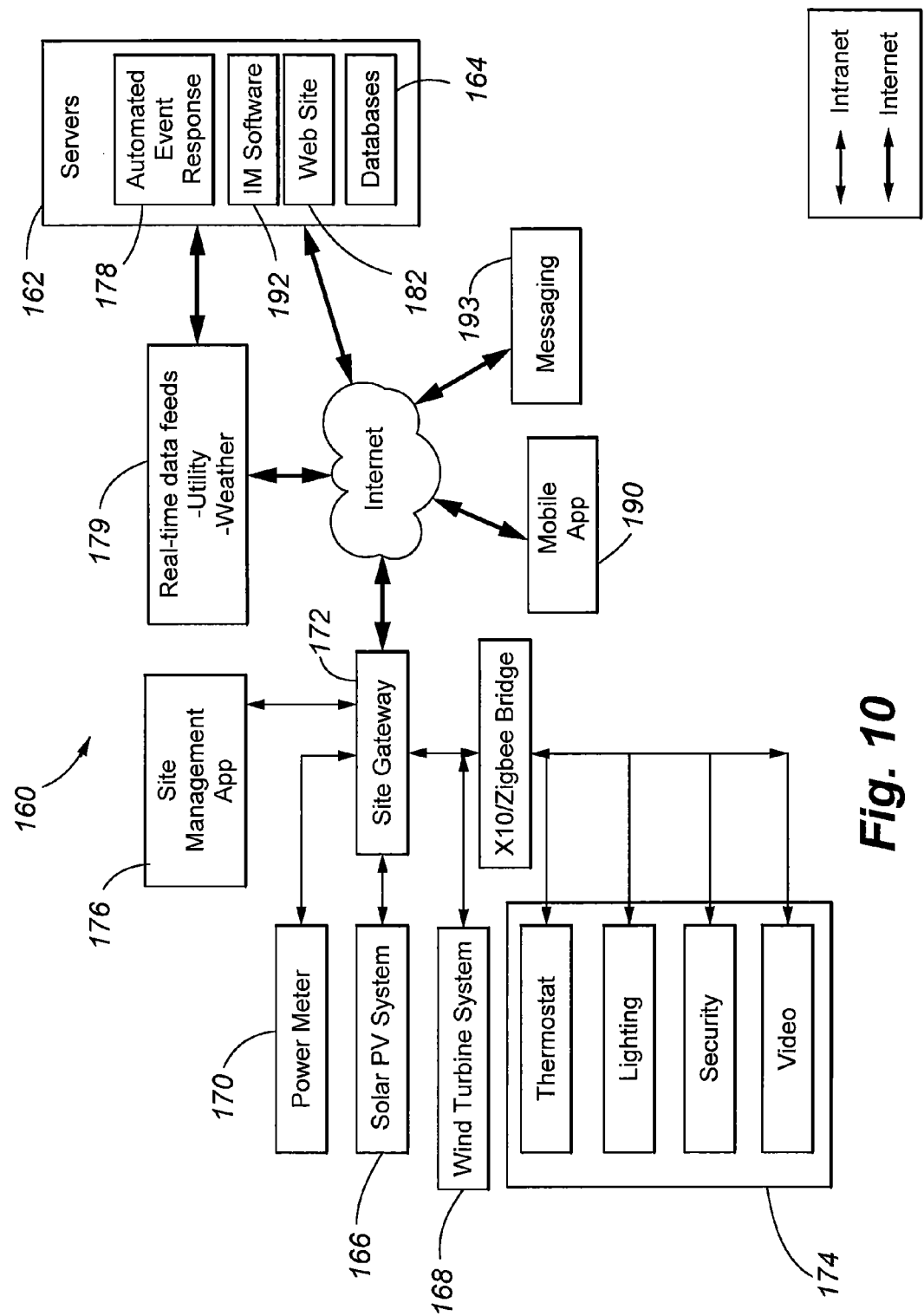
FIG. 10 is a schematic view illustrating an example organization that may incorporate the system and method of the present invention in which various outputs or user interface views are provided to show various system parameters and reporting capabilities to include energy savings and consumption of energy.

FIG. 10 illustrates the data processing system 160 of the present invention along with the various external components and communication means that allow the data processing system to generate selected outputs to a user. These outputs may include reports/bills in either electronic or printed form, as well as a host of graphic user interfaces that can be viewed on a personal computer or any other electronic device of the user/consumer who may wish to retrieve data or reports from the system, or who may otherwise wish to interact with the system. FIG. 10 illustrates infrastructure that compiles data from numerous devices within a building or organization through an Internet gateway for communication to one or more system servers. The servers provide storage of the data for real-time analysis of the incoming data for presentation to users via web browsers and other messaging techniques such as instant messaging. In addition, data from the web based server software can be sent through the site gateway to the same devices to alter their settings. The darker connecting lines indicate preferred Internet connections while the lighter connection lines indicate preferred intranet or local area network connections. More specifically, one or more system servers 162 are provided, and the servers include corresponding databases 164 that store incoming data from various sites that are integrated with the billing system. In FIG. 10, one site is illustrated in which the site includes one or more solar photovoltaic (PV) systems 166, and one or more wind systems 168. The wind and solar PV systems provide the renewable energy. Power meters 170 report on the power consumed from the primary energy sources. The site gateway/bridge 172 provides a connection point for all the devices within a particular building. The gateway may include software or firmware that performs some protocol conversion between device specific protocols and the Internet, or other external bridges may be used for protocol conversion. The primary purpose of the site gateway is to communicate data from these various devices in a uniform way, by encapsulating the data in XML or some other common file format, and transmitting the data to the servers 162 using a standard web protocol such as HTTP. The gateway 172 also provides a means to control building devices from the Internet, the building devices 174 including, for example, changing thermostat settings, turning lights on or off, and selective operation of security or video systems. As Ethernet is generally more expensive than other protocols, these building devices can be connected to the site gateway by other protocols such as X-10, Zigby, RS-485, etc. A site management application 176 is provided, in the form of software/firmware that is capable of performing the various calculations set forth above in order to therefore generate the outputs in the form or reports/bills that are reflective of the various parameters used to ultimately measure a renewable energy bill as the difference between a total energy bill and a primary energy bill. The site management application 176 can be a single web-based application that resides at the servers 162, or can be individual software installations located at the respective site locations and controlled by site administrators responsible for report/billing generation. Real-time weather and utility data 179 can also be provided and integrated with the site management application functionality in order to predict the performance of particular buildings in the systems. For example, if a particularly extreme weather condition is about to occur, the data 179 can be incorporated in revised calculations to account for the effect of the weather that will ultimately effect energy consumption and the billing to the consumer. It is also contemplated that a set of automated responses 178 can be generated to the appropriate support personnel via e-mail, SMS, or instant messenger if a particular installed device is not performing as expected or if other events occur such as consumption or demand beyond a predicted threshold level that could cause the organization to incur unacceptable energy costs for the billing period. In the event the site management application 176 is web based, the servers 162 may also host one or more websites 182 that allows user access and interaction with the system. The interaction can include the ability of a user to view various outputs or user interfaces that report on the status of a particular building or organization within the monitored system. The interaction can also include the ability of a user to query the system to obtain predicted demands and consumptions based upon current recorded data in which projections are made over a future period of time.

A mobile application 190 can also be provided in which a user is able to communicate with the server and query the status of various buildings or organizations. The mobile application would therefore include a separate software installation on the user's computer, mobile phone or PDA that had functionality for communicating with the server to generate reports, view user screens, and/or inquire about specific details for a particular building where the server receives a message from the user and can provide a response based on pre-established reporting criteria for various parameters of a monitored organization or building. For example, a mobile user could request a report on how much power a particular building has generated by installed renewable energy sources over a period of time. The servers may therefore include instant messenger software 192 that interfaces with the mobile user 193 in order to report on the inquiry by accessing the database and generating an answer to the requestor. Based upon the status of the monitored system queried by the user, the user may also then send messages through the servers to the designated locations/installation to control aspects of a building operation, such as a request to turn on the outside lights or to change a setting on a thermostat.

Figure 11:
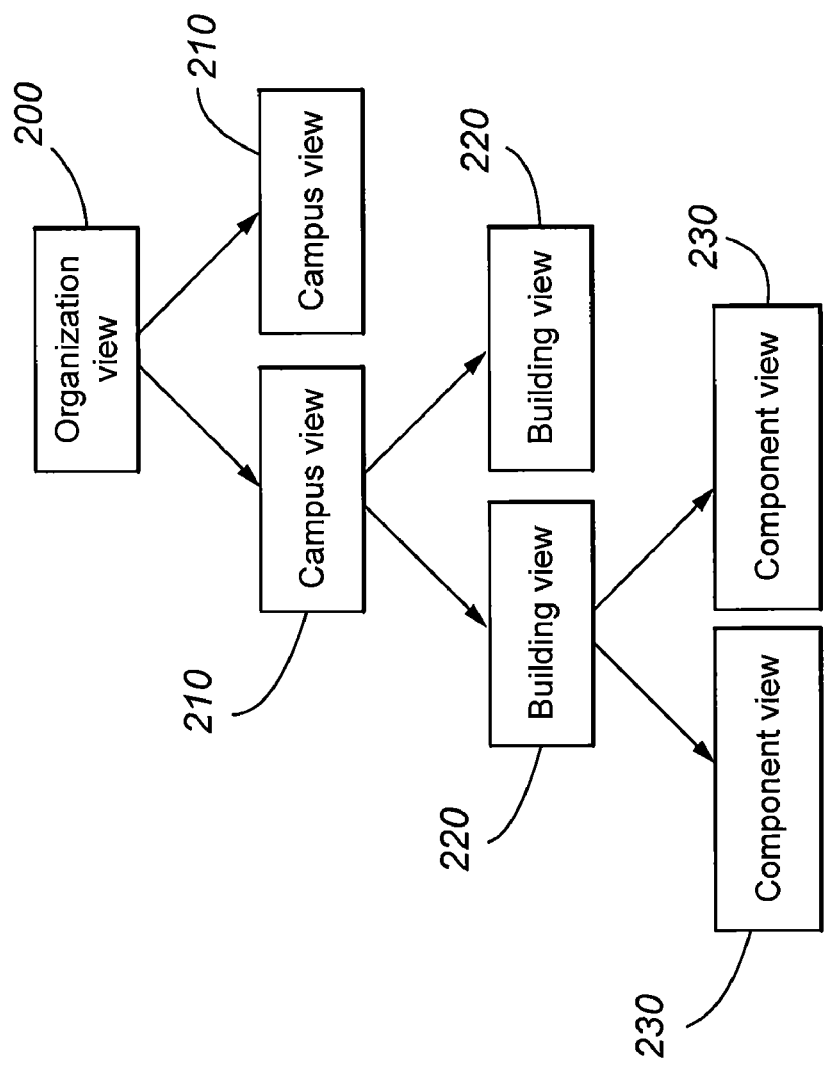
FIG. 11 is a schematic diagram illustrating an organization that may incorporate the system and method of the present invention and the various outputs or user interfaces that can be provided based upon levels within the organization.

Referring to FIG. 11, a schematic diagram is shown as to how a user can navigate a website of the present invention that provides information/reporting on various levels of an organization that has incorporated the system and method of the present invention. An organization view 200 can be provided that has one or more user interfaces for an organizational level view on the energy systems. If the organization has one or more separate locations or campuses, the system of the present invention also provides separate campuses/location views 210 that report in more detail as to the energy systems at the selected locations/campuses. Within each campus 210, there may also be one or more buildings and, therefore, the present invention also contemplates the provision of various building views 220 that provide specific information on each building within the corresponding campus. Finally, within each building, there may be a number of renewable energy components that combine to provide the overall renewable energy contribution, and the present invention also contemplates providing user interface views 230 for reviewing the status and information relating to each separate renewable energy component that may be installed in a particular building.

Figure 12:
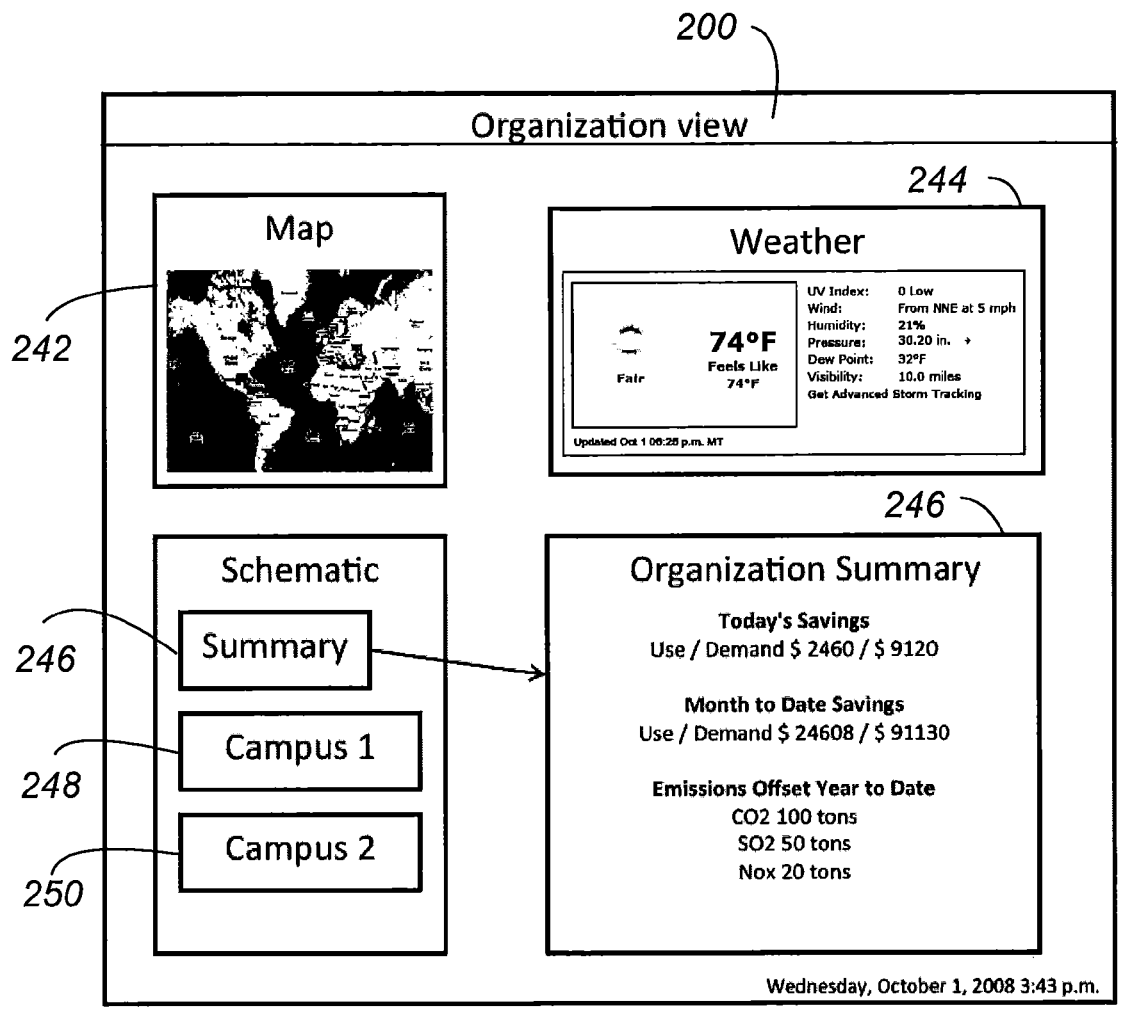
FIG. 12 is a sample user interface screen illustrating data that can be displayed to a user in an organization view.

Referring to FIG. 12, a sample user interface screen is provided in the form of the organization view 200 where a user may view general information about the organization. This screen may be accessible via a web based installation of software in the servers, or a stand alone installation in the user's personal computer. The organization view 200 provides an organization summary 246 with savings provided by the renewable energy resources, such as the day's savings, the month-to-date savings, as well as the emission offsets year-to-date. The emission offsets may be calculated as a function of consumed energy and the amount of energy provided by the renewable energy sources. The savings are shown in terms of use as well as demand. The organization view 200 may also include a map 242 specifying the location of the organization, a weather display 244 that provides real-time weather information for the organization, and other general information that identifies the organization. In addition to the energy produced by renewable energy systems, these systems reduce the emissions of Carbon Dioxide, Sulfur Dioxide, Nitrogen Oxide and other noxious gasses by reducing primary energy consumption. This reduction may be sold as emissions credits. Carbon Dioxide Credits, Sulfur Dioxide Credits and Nitrogen Oxide Credits are commonly traded on the Chicago Climate Exchange. Credits typically represent 100 metric tons (1000 kg) of reduction. The value of a contract for 1 metric ton of CO2 was $3.85, SO2 was $130 and NOx was $951 on Aug. 13, 2008. Conversion from energy to emissions, i.e. kW-hr to kg per kW-hr, is done by multiplying energy by a conversion factor. These factors may be determined by examining the emissions reports generated by local utilities. Table 2 below is one example of how a utility may report their emission averages.

TABLE 2

Example Energy Emission Averages

| | | |
|---|---|---|
| CO2 | 1451 lbs/MW-hr | 658 kg/MW-hr |
| SO2 | 3.2 lbs/MW-hr | 1.5 kg/MW-hr |
| NOx | 2.8 lbs/MW-hr | 1.3 kg/MW-hr |

Thus, the value of reduced emissions/emission credits can be incorporated in the present invention as well.

Figure 13:
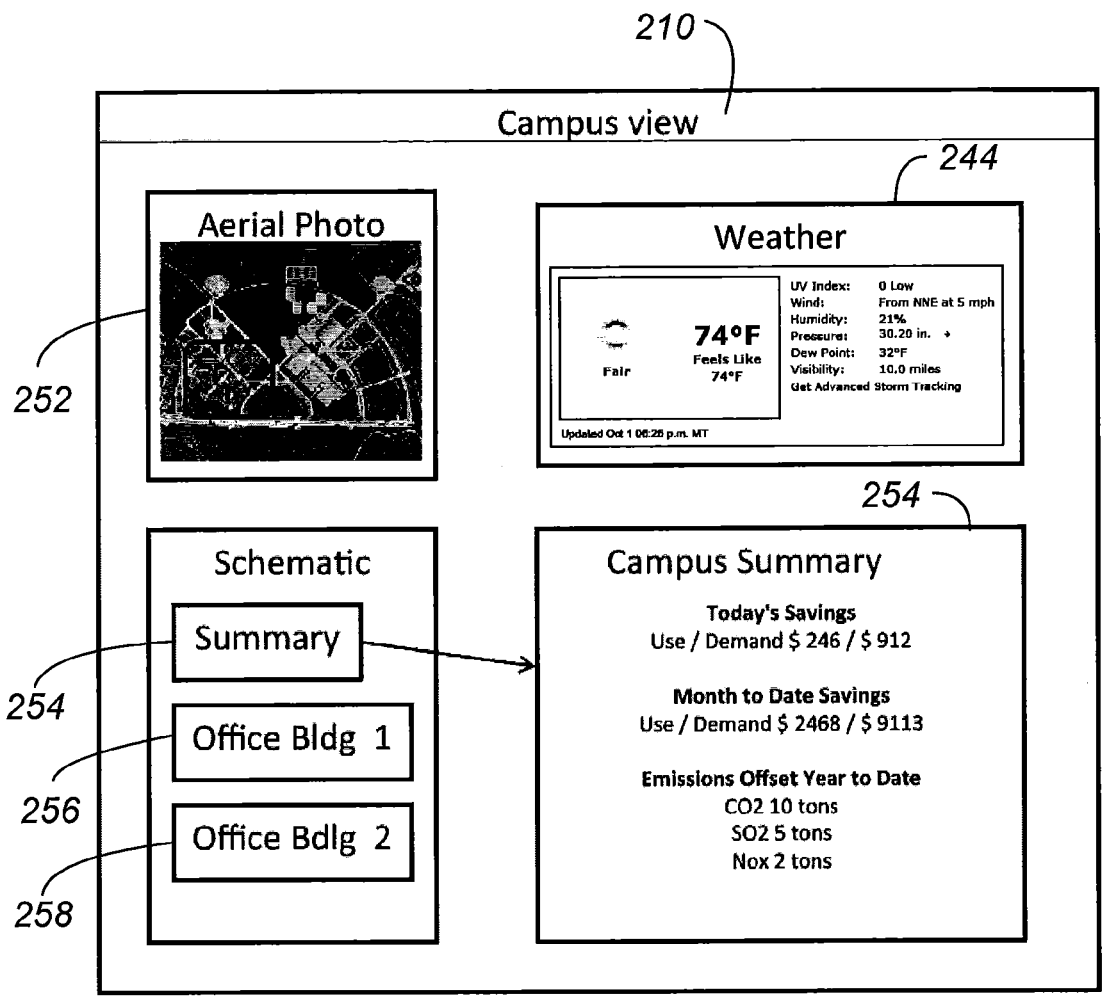
FIG. 13 is another user interface screen illustrating data that can be displayed in a campus view.

FIG. 12 also illustrates that campus views are available for the user to view further information for particular campuses/locations by selecting the corresponding campus tab/buttons 248 and 250. Therefore, referring to FIG. 13, one campus view 210 provides a campus summary 254 showing the savings for the campus on that day/month, as well as applicable emission offsets for the campus. The campus may include a number of buildings. Therefore, the campus view 210 also provides tab/buttons 256 and 258 that allow a user to view selected building views 220. The campus view 210 may also include its own aerial photograph or map 252 of the particular campus and weather 244.

Referring to FIG. 14, one of the building views 220 is shown in terms of data applicable to that particular office building. In the example of FIG. 14, the user interface can display information about selected buildings, namely, Office Buildings 1 and 2 by selecting the corresponding buttons/tabs 256 and 258. In FIG. 14, the Office Building 1 data is shown that includes a graphical display of energy savings for the building on the day and for the month, as well as a graph that plots information pertaining to the building load, the PV load, the utility load, and the utility rate over a designated period of time. The vertical axis on the graph can be the load and/or utility rate, while the horizontal axis is the elapsed time of the survey.

Figure 15:
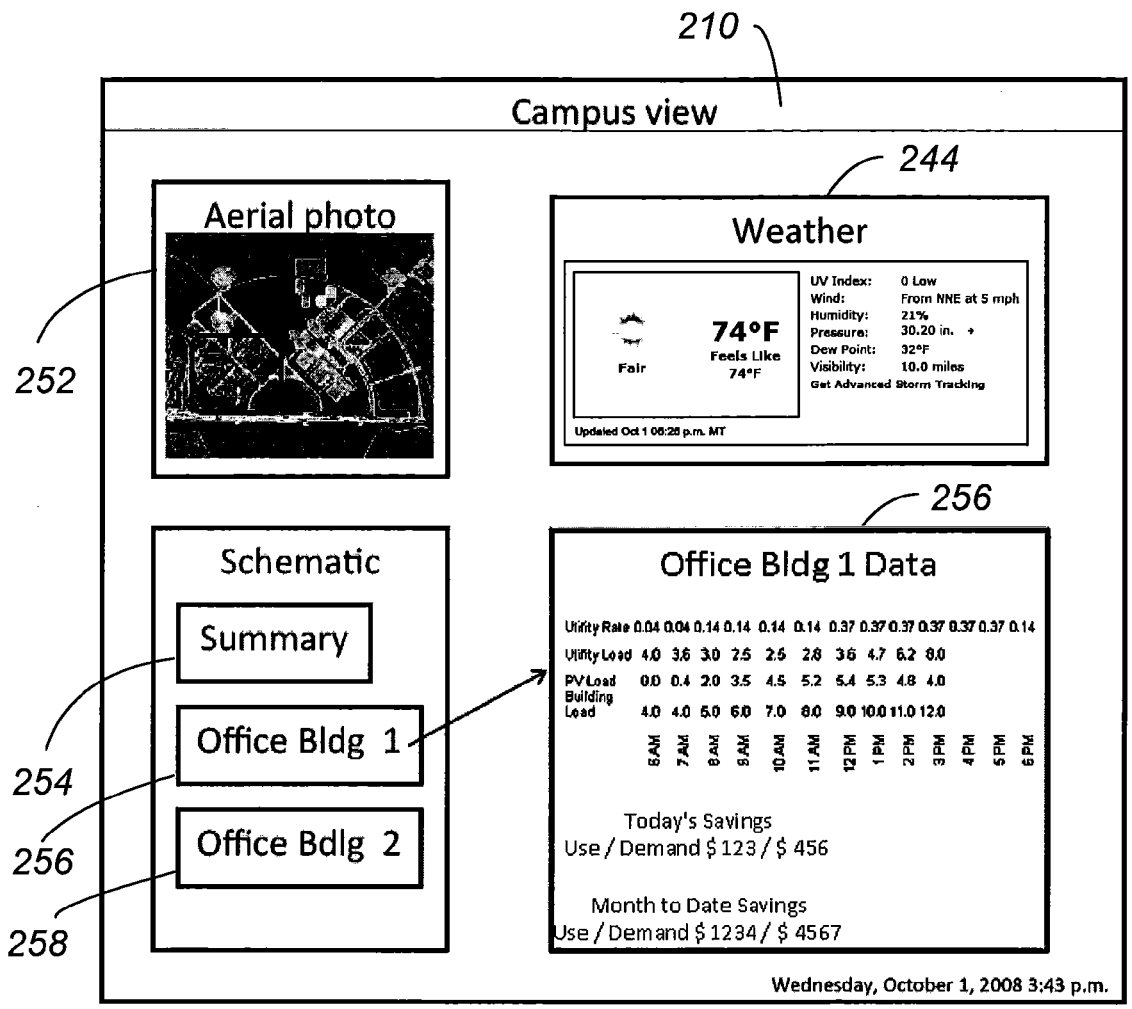
FIG. 15 is another user interface screen illustrating data that can be provided in yet another campus view.

Referring to FIG. 15, another campus view 210 is provided in which the office building summary shown in FIG. 14 is presented in another format, depending upon the preference of the user who may set the manner in which the data is to be presented. In this screen, the data for Office Building 1 is provided in a tabular format as opposed to the graphical format of FIG. 14.

Figure 16:
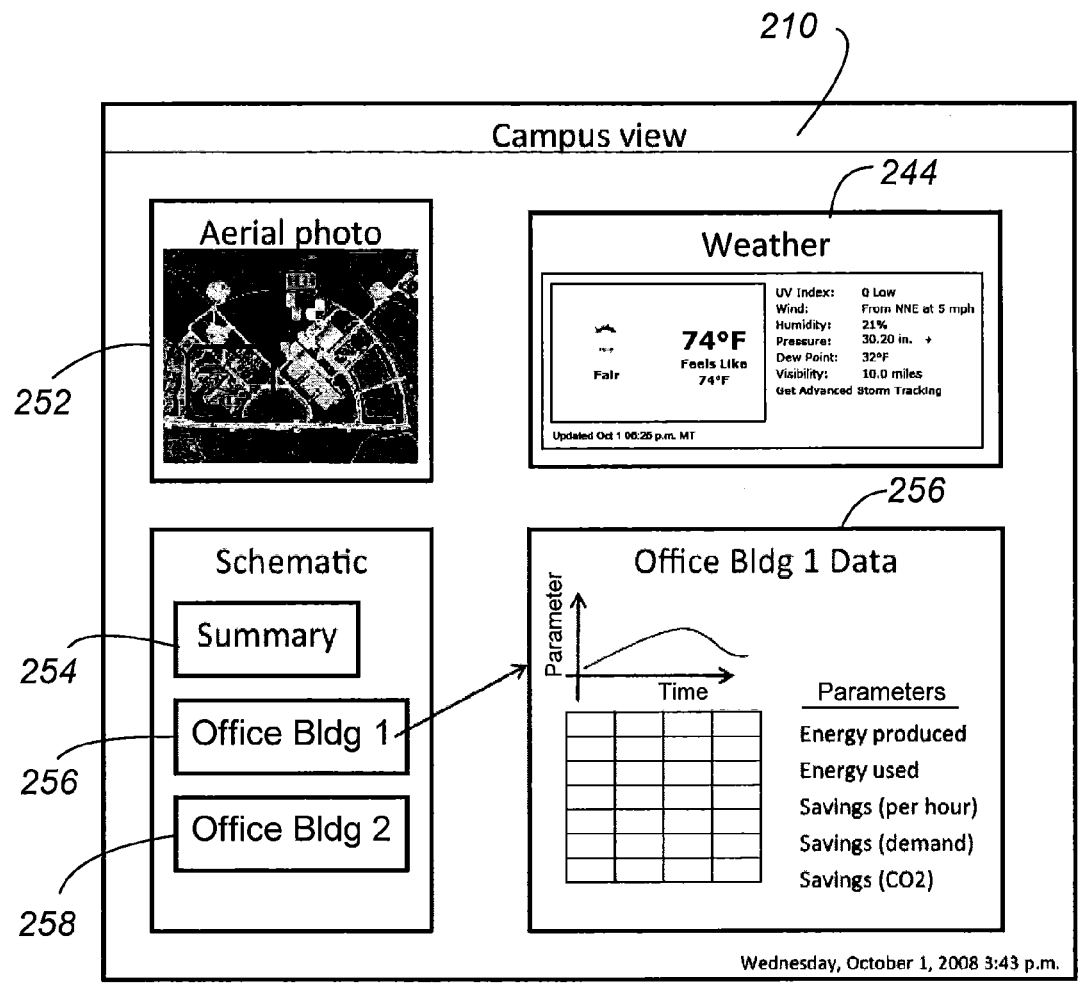
FIG. 16 is another user interface screen illustrating data that can be viewed in yet another campus view.

FIG. 16 illustrates yet another campus view 210 in which the data for the building is displayed in a different manner. As shown, data can be displayed on a graph from a menu of individual parameters. The parameters can be plotted on the vertical axis, and such parameters may include energy produced, energy used, savings (per hour) savings (demand), and savings (emissions such as CO2). In the example of FIG. 16, the selected parameter can be plotted over time along the horizontal axis.

Figure 17:
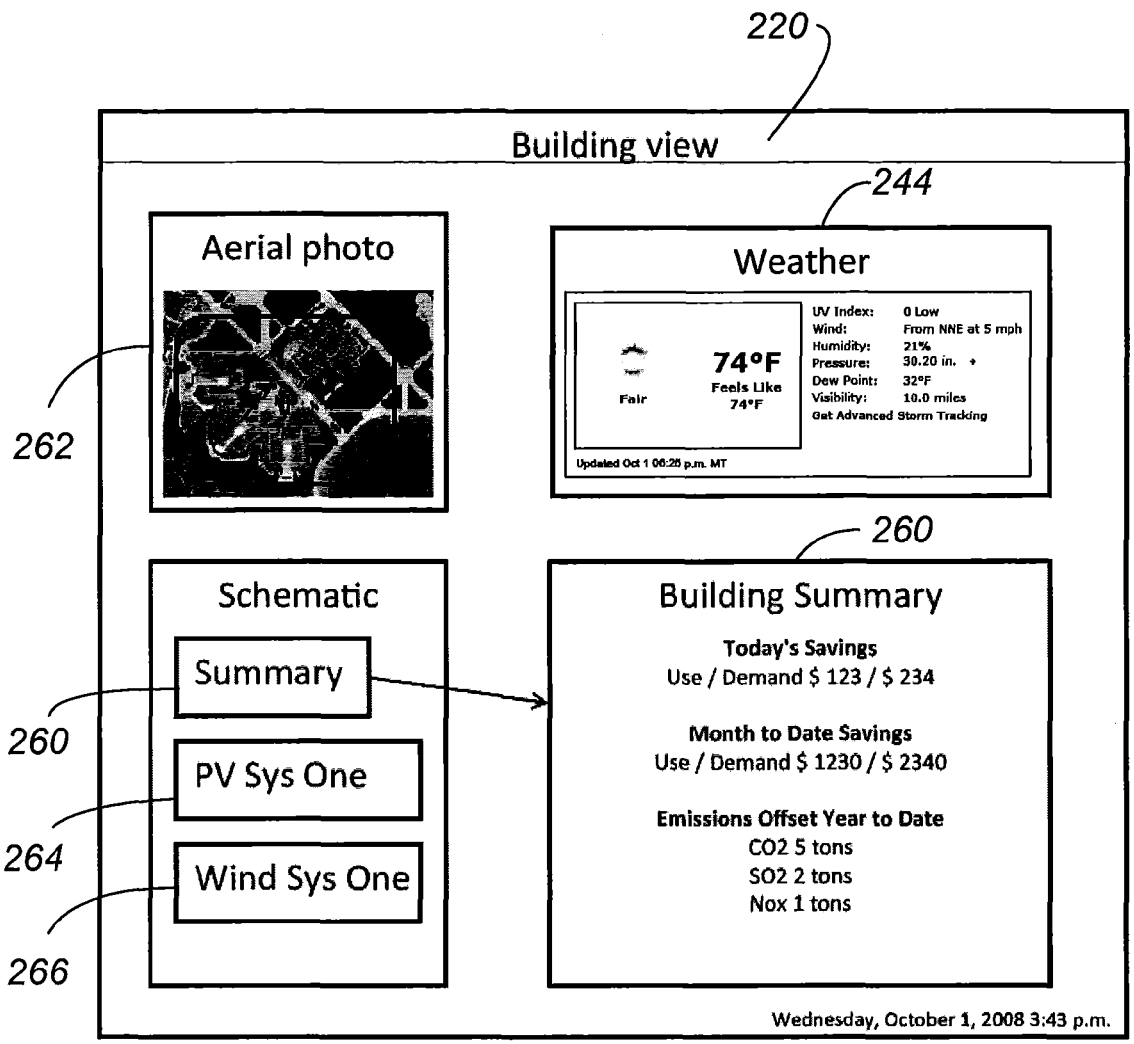
FIG. 17 is a sample user interface screen illustrating data that can be viewed in a building view.

FIG. 17 is another user interface illustrating a building view 220. The building view provides a building summary 260 with data including the savings for the building for the day, the month, and emission offsets. The user interface also displays the type of renewable energy resources that are installed within the building, namely, a solar panel array designated as PV System One and a wind turbine system designated as Wind System One. Tabs/buttons 264 and 266 are provided for the user to display information pertaining to the selected renewable energy sources. The building view of FIG. 17 can also include its own aerial photograph/map 262 that specifically shows the particular building, as well as the applicable weather 244 for the building.

Figure 18:
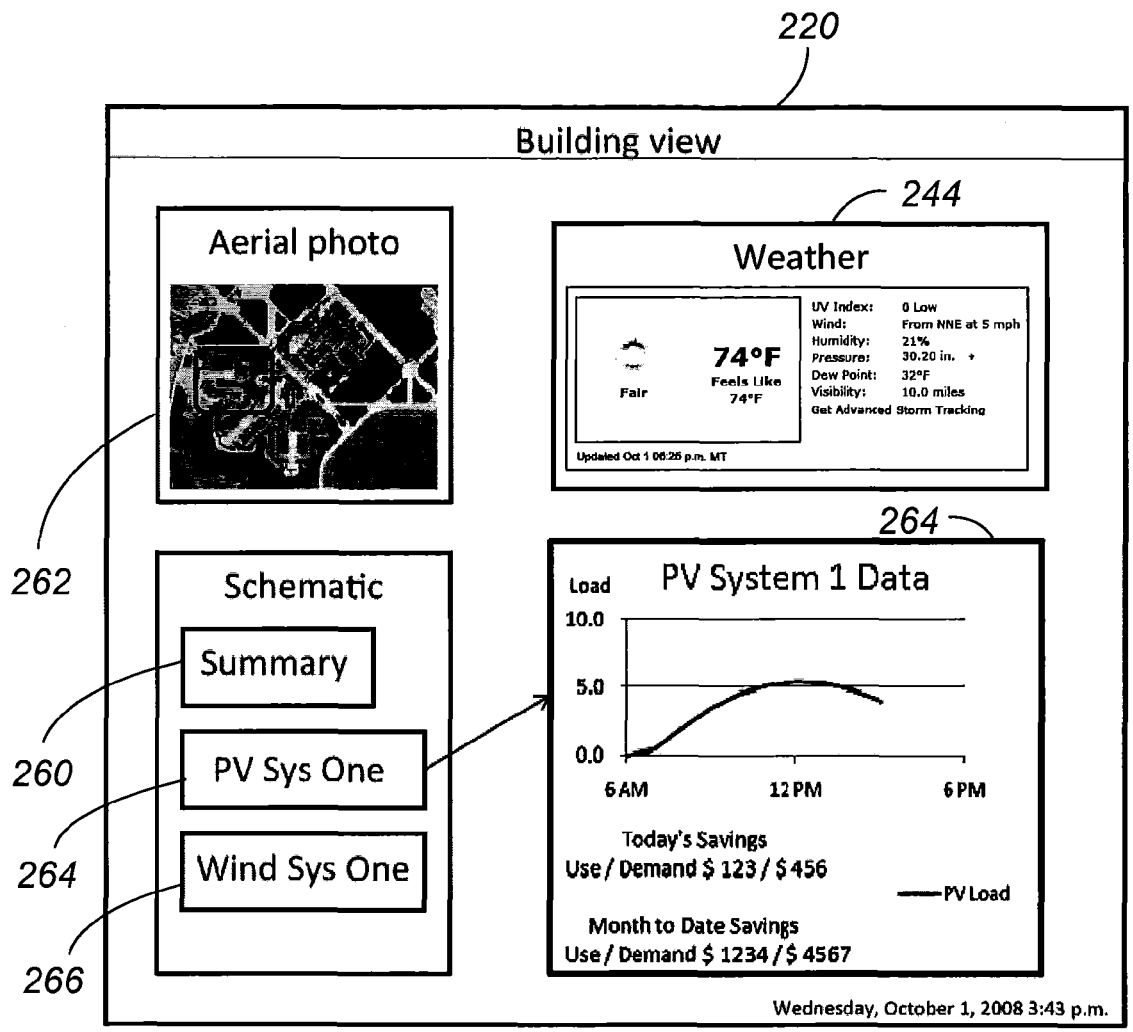
FIG. 18 is another sample user interface screen illustrating additional data that can be viewed in another building view.

Referring to FIG. 18, another user interface screen is provided for the building view 220 in which data is displayed 264 concerning the functioning of the solar panel arrays of PV System One. The data includes a graph showing the load handled by the arrays over a period of time, as well as the energy savings for the day and month by use of the solar panel arrays.

Figure 19:
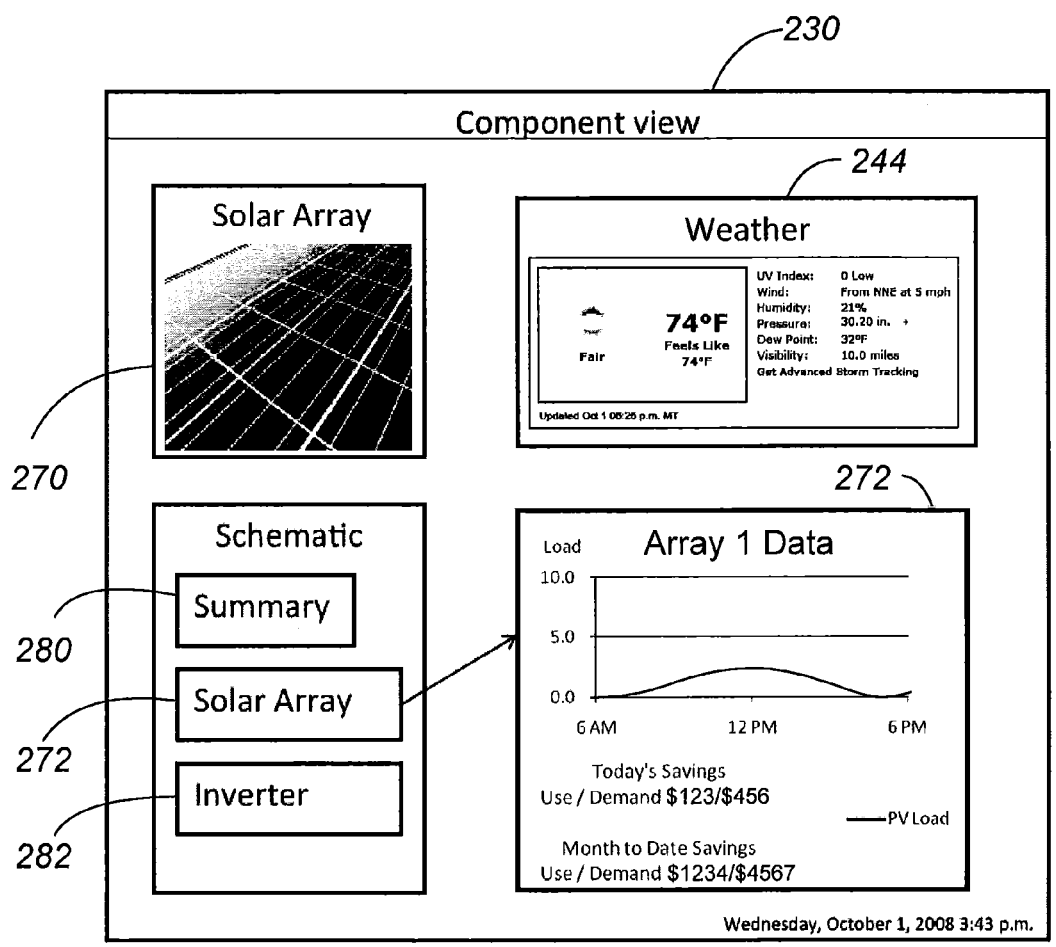
FIG. 19 is another sample user interface screen illustrating data that can be displayed for a particular energy producing component within the system.

FIG. 19 illustrates yet another user interface in accordance with the present invention in which a component view 230 is provided showing data for a selected solar panel array of the group of solar panel arrays of PV System One. In the component view, the data displayed may include specifications 270 about the solar panel, the weather 244, and data 272 for the particular solar panel array. A tab/button 280 is provided to display a summary of the data for the selected component. In FIG. 19, the data for the selected solar array 272 is shown in a graphical format similar to FIG. 18 in which the graph shows the load handled by the array over a period of time, as well as the energy savings for the day and month by use of the solar panel array. Tab/button 282 is also provided to display data for an inverter used in the selected solar array.

With the system and method of the present invention, a billing system is provided taking into account renewable energy sources that can be directly interfaced with standard utility bills and provided to a user. The data processing system of the invention provides a way in which to gather data for particular organization in order to generate the bills, as well as to provide a number of user interfaces that allows a user to observe and monitor various levels of an organization in terms of the renewable energy resources used. The user has the option to view energy data at all levels of an organization ranging from a very broad view of the entire organization down to component level where the user can better manage energy consumption.

With respect to the predictive analysis provided by the present invention, the detailed reporting at all levels of an organization allows a user or automated system to make timely decisions as to how best to implement renewable energy resources. For example, during periods in which a renewable energy source may be particularly productive, the user can scale down the use of the primary energy source with the expectation that the renewable energy source will be able to handle an increased load during the period. Further for example, a user can dedicate future additional capital for increased use of a particular type of renewable energy source based on favorable past performance of the renewable energy source at a particular location.

While the present invention has been disclosed with respect to various preferred aspects of the present invention, it shall be understood that various other changes and modifications to the invention can be made in accordance with the scope of the claims appended hereto.

What is claimed is:

1. A method for providing an energy bill to a consumer that integrates a primary energy source and one or more renewable energy sources, said method comprising the steps of:
    providing at least one computing device having a microprocessor for executing computer coded instructions, said computer coded instructions including instructions for a plurality of equations that calculate attributes of an energy bill;
    obtaining rates that determine primary energy cost including energy demand rates, usage rates, and tax rates for predetermined time periods or consumption levels for the primary energy source;
    obtaining a primary energy demand and usage for the period for the primary energy source;
    calculating, via the computing device, a value of a primary energy bill based upon demand and usage of the primary energy source;
    obtaining a renewable energy demand and usage from the renewable energy source;
    summing, via the computing device, the renewable energy usage plus primary usage to calculate period consumption;
    summing, via the computing device, the period consumption over a billing period to calculate a total period consumption, wherein the total period consumption is required when a tiered billing structure is used;
    summing, via the computing device, the renewable demand plus primary energy demand to calculate a total demand;
    calculating, via the computing device, a value of a total energy bill based upon the total period consumption, the total demand, and the primary energy cost rates;
    calculating, via the computing device, a renewable energy bill as a difference between the total energy bill and the primary energy bill; and
    generating, via the computing device, an output to a consumer in the form of at least one of a billing report or user interface detailing at least one of the renewable energy bill, the total energy bill and the primary energy bill.

2. The method as claimed in claim 1, wherein the output to the consumer includes an energy bill setting forth an incremental time basis for demand and energy usage, separated into demand and usage by the renewable energy sources and the primary energy source.

3. A method, as claimed in claim 1, wherein:
    said primary energy demand and usage and said renewable energy demand and usage are provided as inputs to a data processing system and are calculated simultaneously in said data processing system to generate an integrated energy billing report.

4. The method, as claimed in claim 1, wherein:
    said renewable energy sources include at least one of a solar collector and a wind turbine.

5. A method, as claimed in claim 1, wherein:
    said output to the consumer is separated into preselected time period reports including at least one of (i) a minute-by-minute analysis (ii) an hour-by-hour analysis and (ii) a day-by-day analysis.

6. A data processing system for managing data for traditional and renewable energy sources and generating outputs to a user detailing energy consumption, demand, and costs, said data processing system comprising:
    at least one computer having a microprocessor for computing data input to said computer;
    at least one site management application including at least one of a software or firmware installation that provides computer coded instructions to said computer for managing data manipulated by said computer;
    at least one database communicating with said computer for storing data regarding energy rates, consumption, and demand;
    data inputs from a primary energy source to the computer detailing primary energy rates, primary energy consumption, and primary energy demand, wherein said microprocessor is configured to calculate a value of a primary energy bill based upon the primary energy rates, the primary energy consumption, and the primary energy demand;
    data inputs from a renewable energy source to the computer detailing renewable energy consumption and renewable energy demand for the renewable energy source, wherein said microprocessor is configured to calculate a total energy bill based upon the primary energy rates, the primary energy consumption, the primary energy demand ,the renewable energy consumption, and the renewable energy demand, and wherein said microprocessor is configured to calculate a renewable energy bill as a difference between the total energy bill and the primary bill; and
    outputs generated by said data processing system to a user, said outputs including at least one of a billing to a consumer that delineates the renewable energy bill as a difference between the total energy bill and the primary energy bill, and at least one user interface displaying information regarding the renewable energy bill.

7. A system, as claimed in claim 6, further including:
a user interface generated by said data processing system including at least one of an organization summary, a campus summary, a building summary, a component summary and a billing summary, said summaries including a listing of energy savings by incorporation of the renewable energy source as compared to a cost of the energy if the renewable energy source was not used.

8. A system, as claimed in claim 6, wherein:
said user interface includes graphical data plotted over time illustrating energy savings by use of the renewable energy source.

9. A system, as claimed in claim 6, wherein:
said user interface includes a component view detailing information about a selected renewable energy component installed at a site location, said component view including a graphical display of the energy produced by the component over a period of time.

10. A method for providing an energy bill to a consumer that integrates a primary energy source and at least one renewable energy source, said method comprising;
providing at least one computing device having a microprocessor for executing computer coded instructions, said computer coded instructions including instructions for a plurality of equations that calculate attributes of an energy bill;
obtaining data reflective of a primary energy cost for the primary energy source;
obtaining a primary energy demand and usage for the primary energy source;
calculating, via the computing device, a value of a primary energy bill based upon demand and usage of the primary energy source;
obtaining a renewable energy demand and usage for the renewable energy source;
calculating, via the computing device, a period consumption from the renewable energy usage and the primary energy usage;
summing, via the computing device, the renewable energy demand plus the primary energy demand to calculate a total demand;
calculating, via the computing device, a value of a total energy bill;
calculating, via the computing device, a renewable energy bill as a difference between the total energy bill and the primary energy bill; and
generating, via the computing device, an output to a consumer in the form of at least one of a billing report or user interface detailing the renewable energy bill.

11. A method, as claimed in claim 10, further including:
generating, via the computing device, a user interface including at least one of an organization summary, a campus summary, a building summary, a component summary and a billing summary, said summaries including a listing of energy savings by incorporation of the renewable energy source as compared to a cost of the energy if the renewable energy source was not used.

12. A method, as claimed in claim 10, wherein:
said user interface includes graphical data plotted over time illustrating energy savings by use of the renewable energy source.

13. A method, as claimed in claim 10, wherein:
said user interface includes a component view detailing information about a selected renewable energy component installed at a site location, said component view including a graphical display of the energy produced by the component over a period of time

* * * * *

UNITED STATES PATENT AND TRADEMARK OFFICE
CERTIFICATE OF CORRECTION

PATENT NO. : 8,214,270 B2
APPLICATION NO. : 12/349085
DATED : July 3, 2012
INVENTOR(S) : Schaefer et al.

It is certified that error appears in the above-identified patent and that said Letters Patent is hereby corrected as shown below:

Column 20, Line 57: "demand ,the" should read "demand, the"

Column 20, Line 61: "the primary bill" should read "the primary energy bill"

Signed and Sealed this
Fourteenth Day of August, 2012

David J. Kappos
*Director of the United States Patent and Trademark Office*